(12) United States Patent
Limarga et al.

(10) Patent No.: US 12,215,053 B2
(45) Date of Patent: Feb. 4, 2025

(54) ELECTRONIC DEVICES WITH TEXTURED GLASS AND GLASS CERAMIC COMPONENTS

(71) Applicant: Apple Inc., Cupertino, CA (US)

(72) Inventors: Andi M. Limarga, Cupertino, CA (US); Akanksha Agrawal, Sunnyvale, CA (US); Albert Ochagavia Tobena, Cupertino, CA (US); Jason P. Shannon, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/389,572

(22) Filed: Nov. 14, 2023

(65) Prior Publication Data
US 2024/0083805 A1    Mar. 14, 2024

Related U.S. Application Data

(63) Continuation of application No. 17/109,887, filed on Dec. 2, 2020, now Pat. No. 11,897,809.
(Continued)

(51) Int. Cl.
*H05K 5/00*    (2006.01)
*C03C 15/00*   (2006.01)
(Continued)

(52) U.S. Cl.
CPC ............ *C03C 15/00* (2013.01); *C03C 17/002* (2013.01); *C03C 21/002* (2013.01); *H04B 1/3827* (2013.01); *C03C 2217/72* (2013.01)

(58) Field of Classification Search
CPC ..... C03C 15/00; C03C 17/002; C03C 21/002; H04B 1/3827
See application file for complete search history.

(56) References Cited

U.S. PATENT DOCUMENTS

| 4,633,323 A | 12/1986 | Haberkern et al. |
| 5,476,821 A | 12/1995 | Beall et al. |

(Continued)

FOREIGN PATENT DOCUMENTS

| CN | 101712102 | 5/2010 |
| CN | 203013800 | 6/2013 |

(Continued)

OTHER PUBLICATIONS

Author Unknown, "LG's Future Display Technology Will Blow You Away," Techno Source, https://www.youtube.com/watch?v=qlRjytgNuhM, 2 pages, May 2, 2017.
(Continued)

*Primary Examiner* — Simon King
(74) *Attorney, Agent, or Firm* — Brownstein Hyatt Farber Schreck, LLP

(57) ABSTRACT

Electronic devices including a textured component such as a cover member positioned over one or more components of the electronic device. Different surface regions of the textured component may be textured differently in order to provide optical contrast. For example, differently textured surface regions may differ in gloss, translucency, or both. In some cases the cover member defines a protruding feature and a surface region of the protruding feature is textured differently than an adjacent surface region.

20 Claims, 11 Drawing Sheets

Related U.S. Application Data

(60) Provisional application No. 63/073,521, filed on Sep. 2, 2020.

(51) Int. Cl.
    *C03C 17/00*     (2006.01)
    *C03C 21/00*     (2006.01)
    *H04B 1/3827*    (2015.01)

(56) References Cited

U.S. PATENT DOCUMENTS

| | | | |
|---|---|---|---|
| 6,068,891 | A | 5/2000 | O'Dell et al. |
| 6,229,697 | B1 | 5/2001 | Selker |
| 6,677,703 | B2 | 1/2004 | Ito et al. |
| 6,762,931 | B2 | 7/2004 | Chen |
| 7,297,386 | B2 | 11/2007 | Suzuki et al. |
| 7,646,143 | B2 | 1/2010 | Kimura et al. |
| 8,092,911 | B2 | 1/2012 | Sakoske et al. |
| 8,106,787 | B2 | 1/2012 | Nurmi |
| 8,184,373 | B2 | 5/2012 | Tanaka et al. |
| 8,213,085 | B2 | 7/2012 | Liu et al. |
| 8,553,333 | B2 | 10/2013 | Chang et al. |
| 8,576,561 | B2 | 11/2013 | Myers et al. |
| 8,603,372 | B2 | 12/2013 | Tanaka et al. |
| 8,681,113 | B1 | 3/2014 | Wu et al. |
| 8,771,532 | B2 | 7/2014 | Carlson et al. |
| 8,872,295 | B2 | 10/2014 | Hermans et al. |
| 8,896,802 | B2 | 11/2014 | Yoneyama et al. |
| 8,953,083 | B2 | 2/2015 | Hedge |
| 9,017,566 | B2 | 4/2015 | Lander et al. |
| 9,034,166 | B2 | 5/2015 | Tatebe et al. |
| 9,154,678 | B2 | 10/2015 | Kwong et al. |
| 9,239,594 | B2 | 1/2016 | Lee et al. |
| 9,240,498 | B2 | 1/2016 | Fujita et al. |
| 9,262,002 | B2 | 2/2016 | Momeyer et al. |
| 9,377,603 | B1 | 6/2016 | Cheng et al. |
| 9,448,713 | B2 | 9/2016 | Cruz-Hernandez et al. |
| 9,554,482 | B2 | 1/2017 | Wilson et al. |
| 9,644,281 | B2 | 5/2017 | Tatebe et al. |
| 9,658,500 | B2 | 5/2017 | Iwamoto |
| 9,720,141 | B1 | 8/2017 | Cheng et al. |
| 9,732,237 | B2 | 8/2017 | Sugamoto et al. |
| 9,745,221 | B2 | 8/2017 | Ehrensperger et al. |
| 9,862,124 | B2 | 1/2018 | Radcliffe et al. |
| 9,875,718 | B1 | 1/2018 | Basehore et al. |
| 9,880,327 | B2 | 1/2018 | Park et al. |
| 9,938,186 | B2 | 4/2018 | Moll et al. |
| 9,961,337 | B2 | 5/2018 | Stroetmann |
| 10,013,020 | B2 | 7/2018 | Hong et al. |
| 10,043,052 | B2 | 8/2018 | Wickboldt et al. |
| 10,101,583 | B2 | 10/2018 | Saenger Nayver et al. |
| 10,171,636 | B2 | 1/2019 | Yeo et al. |
| 10,214,445 | B2 | 2/2019 | Hart et al. |
| 10,298,824 | B2 | 5/2019 | Lee et al. |
| 10,442,151 | B2 | 10/2019 | Ozeki et al. |
| 10,647,032 | B2 | 5/2020 | Radcliffe et al. |
| 10,676,393 | B2 | 6/2020 | Weber et al. |
| 10,690,818 | B2 | 6/2020 | Chen et al. |
| 10,694,010 | B2 | 6/2020 | Jones |
| 10,781,135 | B2 | 9/2020 | Weber et al. |
| 10,827,635 | B1 | 11/2020 | Limarga et al. |
| 10,843,439 | B2 | 11/2020 | Gulati et al. |
| 10,866,616 | B2 | 12/2020 | Seo et al. |
| 10,917,505 | B2 | 2/2021 | Jones |
| 10,948,633 | B2 | 3/2021 | Murakami et al. |
| 10,996,713 | B2 * | 5/2021 | Pakula .................. H04N 23/51 |
| 11,109,500 | B2 | 8/2021 | Shannon et al. |
| 11,112,827 | B2 | 9/2021 | Hendren et al. |
| 11,192,823 | B2 | 12/2021 | Li et al. |
| 11,199,929 | B2 | 12/2021 | Poole et al. |
| 11,369,028 | B2 | 6/2022 | Limarga et al. |
| 11,372,137 | B2 | 6/2022 | Gu et al. |
| 11,397,449 | B2 | 7/2022 | Hendren et al. |
| 11,402,669 | B2 | 8/2022 | Poole et al. |
| 11,533,817 | B2 | 12/2022 | Shannon et al. |
| 11,691,912 | B2 | 7/2023 | Poole et al. |
| 2002/0127565 | A1 | 9/2002 | Cunningham |
| 2003/0011315 | A1 | 1/2003 | Ito et al. |
| 2005/0266250 | A1 | 12/2005 | Hayakawa |
| 2006/0024508 | A1 | 2/2006 | D'Urso et al. |
| 2006/0034042 | A1 | 2/2006 | Hisano et al. |
| 2007/0048513 | A1 | 3/2007 | Okamoto et al. |
| 2007/0195419 | A1 | 8/2007 | Tsuda et al. |
| 2009/0257207 | A1 | 10/2009 | Wang et al. |
| 2012/0025245 | A1 | 2/2012 | Nakamura et al. |
| 2012/0127755 | A1 | 5/2012 | Shiau et al. |
| 2012/0194974 | A1 | 8/2012 | Weber et al. |
| 2012/0218640 | A1 | 8/2012 | Gollier et al. |
| 2012/0274565 | A1 | 11/2012 | Moser et al. |
| 2013/0026593 | A1 | 1/2013 | Hermans et al. |
| 2013/0215513 | A1 | 8/2013 | Liang et al. |
| 2013/0235462 | A1 | 9/2013 | Haas |
| 2013/0273324 | A1 | 10/2013 | Moll et al. |
| 2013/0296155 | A1 | 11/2013 | Beall et al. |
| 2014/0035869 | A1 | 2/2014 | Yun et al. |
| 2014/0063609 | A1 | 3/2014 | Iwata et al. |
| 2014/0098075 | A1 | 4/2014 | Kwak et al. |
| 2014/0106127 | A1 | 4/2014 | Lyons et al. |
| 2014/0327643 | A1 | 11/2014 | Sun et al. |
| 2015/0090689 | A1 | 4/2015 | Guilfoyle et al. |
| 2015/0174625 | A1 | 6/2015 | Hart et al. |
| 2016/0154435 | A1 | 6/2016 | Yanagisawa et al. |
| 2016/0188181 | A1 | 6/2016 | Smith et al. |
| 2016/0224822 | A1 | 8/2016 | Hasegawa et al. |
| 2016/0283014 | A1 | 9/2016 | Rider et al. |
| 2016/0306390 | A1 | 10/2016 | Vertegaal et al. |
| 2016/0357318 | A1 | 12/2016 | Chan et al. |
| 2017/0026553 | A1 | 1/2017 | Lee et al. |
| 2017/0058130 | A1 | 3/2017 | Addleman et al. |
| 2017/0097535 | A1 | 4/2017 | Andou et al. |
| 2017/0176246 | A1 | 6/2017 | Jia et al. |
| 2017/0184764 | A1 | 6/2017 | Matsuyuki et al. |
| 2017/0276618 | A1 | 9/2017 | Takagi |
| 2017/0285227 | A1 | 10/2017 | Chen et al. |
| 2017/0308234 | A1 | 10/2017 | Li et al. |
| 2018/0042131 | A1 | 2/2018 | Liu et al. |
| 2018/0059718 | A1 | 3/2018 | Ramaswamy et al. |
| 2018/0077810 | A1 | 3/2018 | Moon et al. |
| 2018/0086662 | A1 | 3/2018 | Luzzato et al. |
| 2018/0162091 | A1 | 6/2018 | Takeda et al. |
| 2018/0162768 | A1 | 6/2018 | Boek et al. |
| 2018/0215657 | A1 | 8/2018 | Jin et al. |
| 2018/0282201 | A1 | 10/2018 | Hancock et al. |
| 2018/0343755 | A1 | 11/2018 | Park et al. |
| 2018/0352668 | A1 | 12/2018 | Amin et al. |
| 2019/0032237 | A1 | 1/2019 | Kim et al. |
| 2019/0037690 | A1 | 1/2019 | Wilson et al. |
| 2019/0041944 | A1 * | 2/2019 | Pakula .................. G06F 1/1626 |
| 2019/0155339 | A1 | 5/2019 | Fenton et al. |
| 2019/0230204 | A1 | 7/2019 | Zhang |
| 2019/0236887 | A1 | 8/2019 | Rich et al. |
| 2019/0241455 | A1 | 8/2019 | Sweney et al. |
| 2019/0246018 | A1 | 8/2019 | Rho et al. |
| 2019/0256410 | A1 | 8/2019 | Isshiki et al. |
| 2020/0026327 | A1 | 1/2020 | Hendren et al. |
| 2020/0189966 | A1 | 6/2020 | Lee et al. |
| 2020/0199020 | A1 | 6/2020 | Hatano et al. |
| 2020/0389991 | A1 * | 12/2020 | Shannon .................. G06F 1/1656 |
| 2022/0071039 | A1 | 3/2022 | Limarga et al. |
| 2022/0322557 | A1 | 10/2022 | Limarga et al. |
| 2022/0326413 | A1 | 10/2022 | Gu et al. |
| 2022/0357773 | A1 | 11/2022 | Hendren et al. |
| 2023/0014168 | A1 * | 1/2023 | Poole .................. G06F 1/1686 |
| 2023/0124179 | A1 | 4/2023 | Shannon et al. |
| 2024/0069595 | A1 | 2/2024 | Hendren et al. |
| 2024/0081010 | A1 | 3/2024 | Shannon et al. |
| 2024/0081011 | A1 | 3/2024 | Limarga et al. |
| 2024/0184336 | A1 * | 6/2024 | Poole .................. G06F 1/1686 |

FOREIGN PATENT DOCUMENTS

| | | |
|---|---|---|
| CN | 103425243 | 12/2013 |
| CN | 103502166 | 1/2014 |
| CN | 203406929 | 1/2014 |

(56) References Cited

FOREIGN PATENT DOCUMENTS

| | | |
|---|---|---|
| CN | 103702773 | 4/2014 |
| CN | 104024929 | 9/2014 |
| CN | 104321693 | 1/2015 |
| CN | 104583147 | 4/2015 |
| CN | 104981728 | 10/2015 |
| CN | 105283322 | 1/2016 |
| CN | 105359064 | 2/2016 |
| CN | 105988509 | 10/2016 |
| CN | 106155193 | 11/2016 |
| CN | 107438494 | 12/2017 |
| CN | 207070526 | 3/2018 |
| CN | 107911964 | 4/2018 |
| CN | 107924002 | 4/2018 |
| CN | 10832510 | 10/2018 |
| CN | 207992872 | 10/2018 |
| CN | 109202296 | 1/2019 |
| CN | 208433428 | 1/2019 |
| CN | 208461858 | 2/2019 |
| CN | 109547679 | 3/2019 |
| CN | 109640557 | 4/2019 |
| CN | 110713351 | 1/2020 |
| CN | 107683055 | 9/2022 |
| DE | 10223165 | 12/2003 |
| EP | 3454541 | 3/2019 |
| JP | 2011510904 | 4/2011 |
| JP | 2013242725 | 12/2013 |
| JP | 2016045824 | 4/2016 |
| JP | 2017508178 | 3/2017 |
| JP | 2018506851 | 3/2018 |
| KR | 20130127842 | 11/2013 |
| KR | 20160145081 | 12/2016 |
| KR | 20170076779 | 7/2017 |
| KR | 20180018782 | 2/2018 |
| TW | 201910882 | 3/2019 |
| WO | WO2014/011328 | 1/2014 |
| WO | WO2014/012003 | 1/2014 |
| WO | WO2015/191949 | 12/2015 |
| WO | WO2016/088983 | 6/2016 |
| WO | WO2016/196615 | 12/2016 |
| WO | WO2017/038868 | 3/2017 |
| WO | WO2019/027675 | 2/2019 |

OTHER PUBLICATIONS

Ben-Yakar et al., "Femtosecond laser ablation properties of borosilicate glass," Journal of Applied Physics, vol. 96, No. 9, 8 pages, Nov. 1, 2004.

Hedayati et al., Antireflective Coatings: Conventional Stacking Layers and Ultrathin Plasmonic Metasurfaces, A Mini-Review, Materials, vol. 9, No. 497, 2016.

Qi et al., "Simple Approach to Wafer-Scale Self-Cleaning Antireflective Silicon Surfaces," American Chemical Society, State Key Laboratory of Supramolecular Structure and Materials, College of Chemistry, Jilin University, Changchun 130012, P.R. China, 2009.

Seth, Radhika, "A Fresh New Look at the Computer," https://www.yankodesign.com/2009/02/06/a-fresh-new-look-at-the-computer, 1 page, Feb. 6, 2009.

Tan et al., "Broadband antireflection film with moth-eye-like structure for flexible display applications," Optica, vol. 4, No. 7, pp. 678-683, Jul. 2017.

Wimmer, "Curve: Revisiting the Digital Desk," NordiCHI '10: Proceedings of the 6th Nordic Conference on Human-Computer Interaction: Extending Boundaries, https://doi.org/10.1145/1868914.1868977, http://www.mmi.ifi.lmu.de/pubdb/publications/pub/wimmer2010Curve/wimmer2010Curve.pdf, https://dl.acm.org/doi/10.1145/1868914.1868977, pp. 561-570, Oct. 2010.

* cited by examiner

ELECTRONIC DEVICES WITH TEXTURED GLASS AND GLASS CERAMIC COMPONENTS

CROSS-REFERENCE TO RELATED APPLICATION(S)

This application is a continuation patent application of U.S. patent application Ser. No. 17/109,887, filed Dec. 2, 2020 and titled "Electronic Devices with Textured Glass and Glass Ceramic Components," which is a nonprovisional application of and claims the benefit of U.S. Provisional Patent Application No. 63/073,521, filed Sep. 2, 2020 and titled "Electronic Devices with Textured Glass and Glass Ceramic Components," the disclosures of which are hereby incorporated herein by reference in their entireties.

FIELD

The described embodiments relate generally to textured glass and textured glass ceramic components. More particularly, the present embodiments relate to enclosures including the textured components and electronic devices including these enclosures.

BACKGROUND

Traditional glass covers for electronic devices may present a glossy outward facing surface. Some glass manufacturing processes, such as the down draw process and the fusion draw process, give a fine surface finish which produces a glossy appearance. The techniques and articles described herein are directed to textured glass and textured glass ceramic components which include both matte and glossy surface regions.

SUMMARY

Textured glass and textured glass ceramic components for electronic devices are disclosed herein. The textured component is typically included in the enclosure of the electronic device. A textured surface region of the component may be configured to provide a desired appearance and/or "feel" to the exterior surface of the enclosure. In some cases, the textured surface region provides a matte appearance to the exterior surface of the enclosure.

In some cases, the textured component is a cover member positioned over one or more components of the electronic device. As an example, the cover member may define a feature that protrudes beyond an adjacent region of the exterior surface to form a turret. One or more holes may extend through the protruding feature to facilitate positioning of a component of the electronic device. The textured component is typically chemically strengthened by ion exchange.

By the way of example, the electronic device may include a camera assembly positioned at least partially below the textured component. The textured component may define one or more holes extending though the thickness of the textured component. One or more camera modules of the camera assembly may extend into a corresponding hole of the one or more holes. The portion of the textured component including the holes may be thicker than an adjacent portion, so that the thicker portion of the component defines a protruding feature.

In some cases, the textured component includes differently textured regions along an external surface of the component. The differently textured surface regions may produce optical contrast between different portions of the component. For example, the differently textured surface regions may produce different gloss levels, different translucency values, or both. In some embodiments, each of the differently textured surface regions may have a sufficiently high light transmissivity that the color of an internal coating can be perceived through the component.

The differently textured surface regions may also provide a different "feel" to different portions of the component. In some embodiments, each of the textured surface regions may be configured so that the component has an acceptable strength level and/or ability to be cleaned of trapped debris.

In some cases, the enclosure includes a cover assembly and the textured component is part of the cover assembly. For example, the cover assembly may further include an interior coating and/or an exterior coating applied to the textured component. The interior coating may be a cosmetic coating, such as an ink layer. The exterior coating may include one or more of an anti-reflective coating, a smudge-proof coating, such as an oleophobic coating, and the like.

The disclosure provides an electronic device comprising a display, an enclosure at least partially surrounding the display, and a camera assembly. The enclosure comprises a front cover assembly including a front member positioned over the display and a rear cover assembly including a chemically strengthened rear member. The chemically strengthened rear member defines a base portion defining a base surface region and a feature protruding with respect to the base surface region. The feature defines a surface region having a texture comprising a mean pitch from 10 microns to 40 microns and a root mean square slope from 0.1 to 0.75. The camera assembly includes a camera module positioned at least partially in a hole formed through the feature.

In addition, the disclosure provides an electronic device comprising an enclosure including a cover assembly comprising a glass member. The glass member defines a first exterior surface region having a first gloss value greater than 90 gloss units as measured at 60 degrees and defining a first texture having a root mean square height less than 0.5 microns. The glass member further defines a second exterior surface region having a second gloss value less than 10 gloss units as measured at 60 degrees and defining a second texture having a root mean square height from 1 micron to 5 microns and a mean pitch from 10 microns to 40 microns. The cover assembly further comprises a coating disposed along an interior surface of the glass member and viewable through the first and the second textures.

The disclosure further provides an electronic device comprising a display, an enclosure at least partially surrounding the display, and a camera assembly. The enclosure comprises a front cover assembly including a front member positioned over the display and a rear cover assembly including a rear member comprising at least one of a glass or a glass ceramic. The rear member defines a base region of an exterior surface of the rear member, the base region defining a first texture having a root mean square height from 1 micron to 5 microns and a root mean square slope from 0.1 to 0.75. The rear member further defines a feature protruding with respect to the base region, the feature defining a plateau region of the exterior surface of the rear member, the plateau region having optical contrast with the base region and defining a second texture having a root mean square height less than 0.25 microns. The camera assembly includes a camera module positioned at least partially within a hole formed in the feature.

BRIEF DESCRIPTION OF THE DRAWINGS

The disclosure will be readily understood by the following detailed description in conjunction with the accompanying drawings, wherein like reference numerals designate like elements.

Figure 1A:
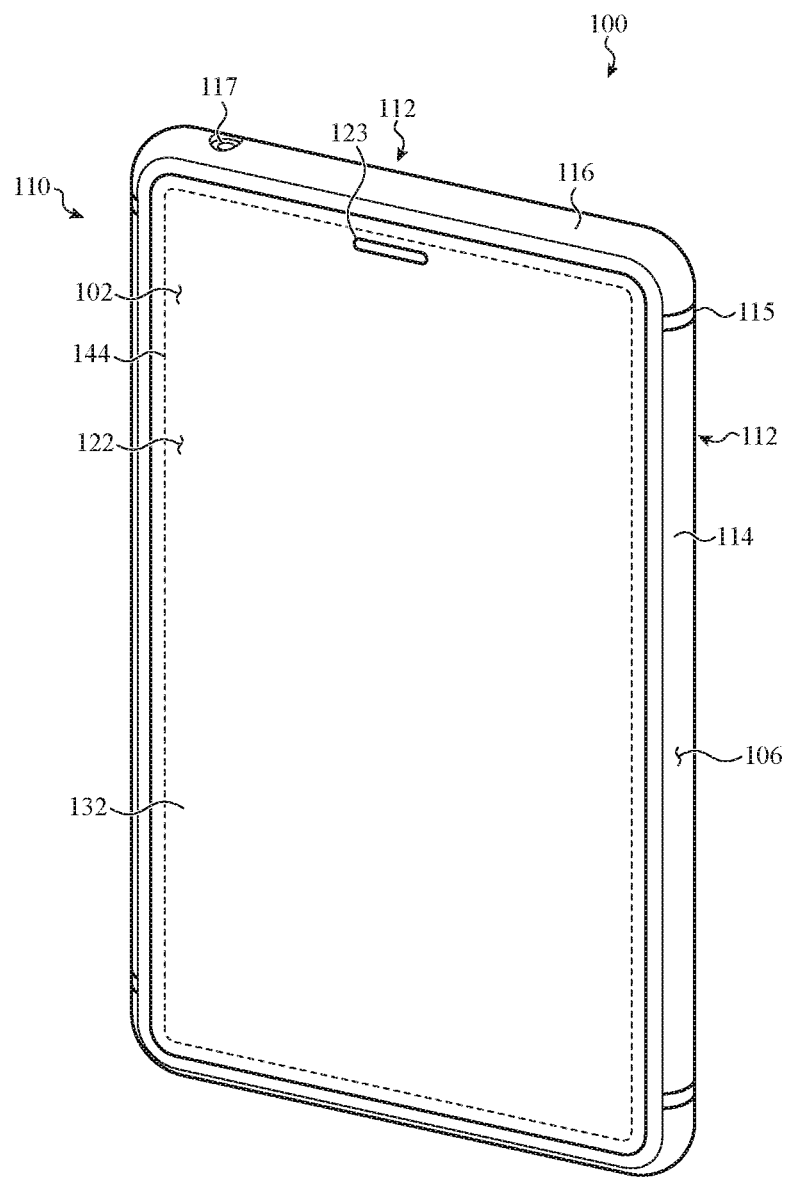
FIG. 1A shows a front view of an example electronic device including a textured cover member.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to electronic devices including a textured component. The textured component is typically included in the enclosure of the electronic device. A textured surface region of the component may be configured to provide a desired appearance and/or "feel" to the exterior surface of the enclosure. In some cases, the textured surface region provides a matte appearance to the exterior surface of the enclosure. In addition, the textured surface region may be configured so that the component has an acceptable strength level and/or ability to be cleaned of trapped debris.

In some cases, the textured component is included in a cover assembly positioned over one or more components of the electronic device. As examples, the textured component may be a cover member positioned over one or more elements of a camera assembly, over a display, over an antenna, over a charging assembly, and/or over any other device component. A cover member may also be referred to herein as a front member, a rear member, or in some cases simply as a member. The textured component may define one or more holes extending though the thickness of the textured component to facilitate positioning of the one or more components of the electronic device. For example, one or more optical modules of the camera assembly may extend into a corresponding hole of the textured component. The textured component is typically chemically strengthened by ion exchange.

Different surface regions of the textured component may be textured differently to produce optical and/or visual contrast. For example, each of the differently textured surface regions may reflect light differently. In addition, each of the differently textured surface regions may affect transmission of light through the component differently. In some cases, a surface region of a thicker portion of the textured component may be textured differently than a surface region of a thinner portion of the textured component, as described in more detail below.

Figure 5:
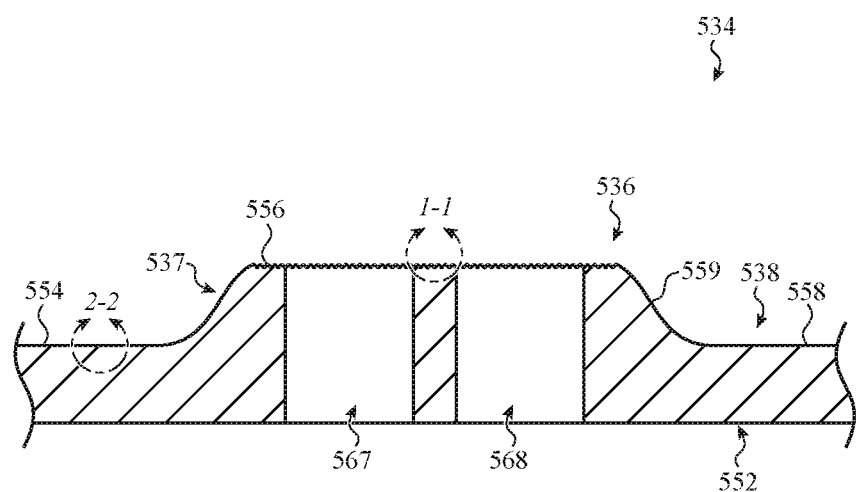
FIG. 5 shows a partial cross-section view of a textured cover member of an electronic device.

In some cases, the differently textured surface regions have different gloss levels. For example, one textured surface region may have a matte appearance while another textured surface region may have a glossy appearance. A gloss measurement can be used to measure the light reflected from the component when a textured surface region is illuminated. In some embodiments, the visual contrast between differently textured surface regions can be characterized by the difference in gloss values. The description of gloss measurements and gloss values provided with respect to FIG. 5 is generally applicable herein and, for brevity, is not repeated here.

In additional cases, differently textured portions of the component have different amounts of translucency. For example, one textured portion of the component may appear translucent while a differently textured portion of the component may appear transparent. A measurement of the percentage of light transmitted through a component can be used to determine an absolute measure of translucency. Relative measures of translucency, such as a contrast ratio, can also be determined. The additional description of absolute and relative measures of translucency provided with respect to FIG. 5 is generally applicable herein and, for brevity, is not repeated here.

The differently textured surface regions may be configured to meet some common performance standards. For example, the differently textured portions of the component may each have a sufficiently high light transmissivity that the color of an internal coating can be perceived through the component. As an additional example, the differently textured surface regions may each be configured so that they do not provide an overly rough "feel" and so that they are not overly difficult to clean.

Figure 6:
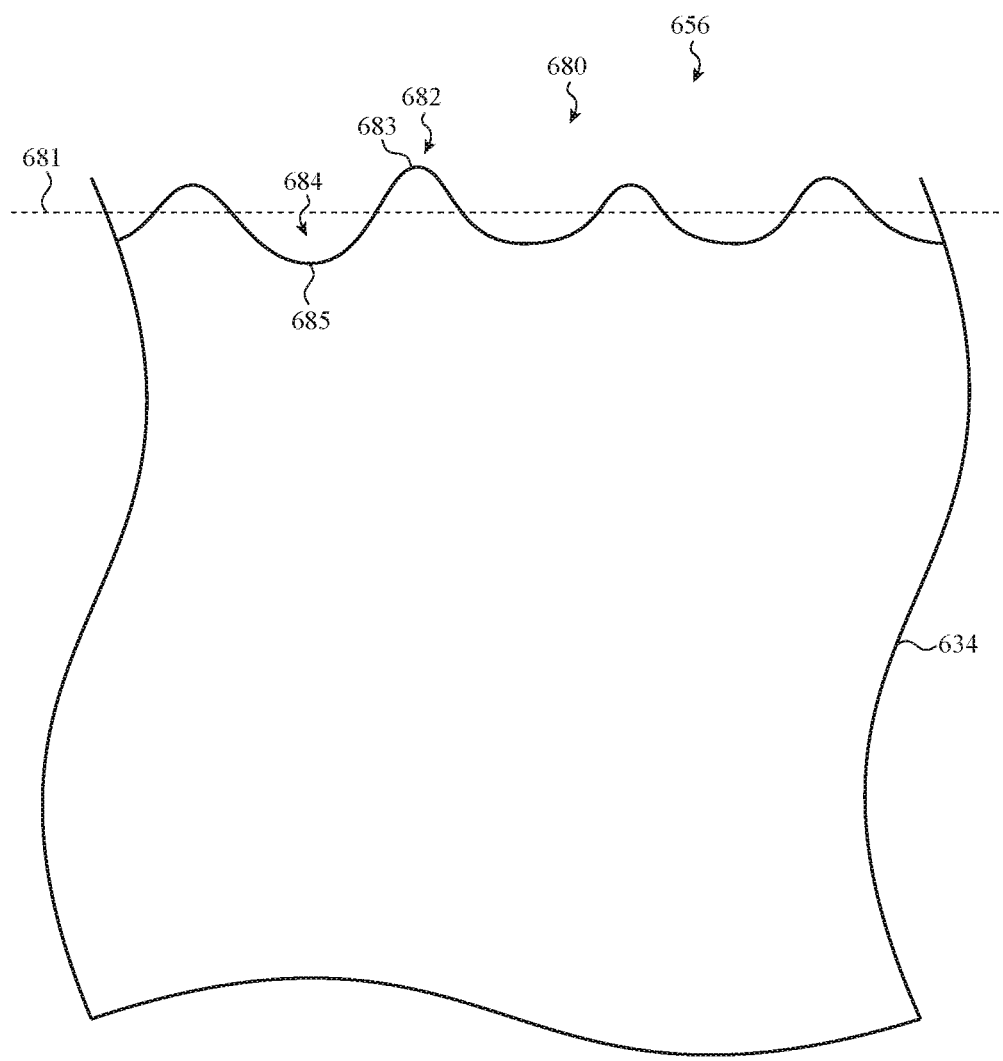
FIG. 6 shows an example of a detailed cross-section view of a first textured surface region of the cover member of FIG. 5.

A textured surface region may be characterized by one or more texture parameters. For example, a textured surface region may be described by one or more of a root mean square (RMS) height of its surface features, a pitch of its surface features, and a root mean square (RMS) slope of its surface features. The description of these and other texture parameters provided with respect to FIG. 6 is generally applicable herein and, for brevity, will not be repeated here.

In some cases, the textured component is a cover member that defines a feature that protrudes beyond an adjacent region of the exterior surface, also referred to herein as a protruding feature or simply as a feature. A surface region of the feature may define a plateau which is substantially parallel to the adjacent region of the exterior surface. One or more holes may extend through the protruding feature to facilitate positioning of one or more device components. A portion of the textured component including one or more through-holes may be thicker than an adjacent portion of the textured component, as described in more detail with respect to FIGS. 1B through 5. The description provided with respect to FIGS. 1B through 5 is generally applicable herein and, for brevity, is not repeated here.

In some cases, a surface region of the thicker portion is textured to produce a lower gloss level than a surface region of the thinner portion of the cover member. As examples, a gloss measurement of the surface region of this thicker portion may give a gloss value less than about 20 gloss units, less than about 10 gloss units, from 1 gloss unit to less than 10 gloss units, from 2 gloss units from 7 gloss units, or from 10 gloss units to 20 gloss units, as measured at 60 degrees. In some cases, the surface region of this thicker portion may be characterized by one or more of the following roughness parameters. The root mean square height may be from 0.75 to 5 microns or from 1 micron to 5 microns. The mean pitch may be from 10 microns to 40 microns or from greater than 20 microns to less than or equal to 40 microns. The root mean square slope may be from 0.1 to 0.75, from 0.2 to 0.65, or from 0.3 to 0.75. The peak sharpness may be from 0.75 microns$^{-1}$ to 1.5 microns$^{-1}$.

A gloss measurement of the surface region of this thinner portion may give a gloss value greater than about 70 gloss units, greater than about 80 gloss units, greater than about 90 gloss units, greater than about 100 gloss units, from 80 gloss units to less than 160 gloss units, from 90 gloss units to 150 gloss units, or from 100 gloss units to 140 gloss units, as measured at 60 degrees. The surface region of this thinner portion may have a root mean square height less than 0.5 microns, less than 250 nm, or from 1 nm to about 250 nm.

In additional cases, a surface region of the thicker portion is textured to produce a higher gloss level than a surface region of the thinner portion of the cover member. As an example, a gloss measurement of the surface region of this thicker portion may give a gloss value greater than about 70 gloss units, greater than about 80 gloss units, greater than about 90 gloss units, greater than about 100 gloss units, from 80 gloss units to less than 160 gloss units, from 90 gloss units to 150 gloss units, or from 100 gloss units to 140 gloss units, as measured at 60 degrees. The surface region of this thicker portion may have a root mean square height less than 0.5 microns, less than 250 nm, or from 1 nm to about 250 nm. A gloss measurement of the surface region of this thinner portion may give a gloss value less than about 20 gloss units, less than about 10 gloss units, from 1 gloss unit to less than 10 gloss units, from 2 gloss units to 7 gloss units, or from 10 gloss units to 20 gloss units as measured at 60 degrees. In some cases, the surface region of this thinner portion may be characterized by one or more of the following roughness parameters. The root mean square height may be from 0.75 microns to 5 microns or from 1 micron to 5 microns. The mean pitch may be from 10 microns to 40 microns, from 15 microns to 40 microns, or from greater than 20 microns to less than or equal to 40 microns. The root mean square slope may be from 0.1 to 0.75, from 0.2 to 0.65, or from 0.3 to 0.75. The peak sharpness may be from 0.75 microns$^{-1}$ to 1.5 microns$^{-1}$. In some cases, the cover members of these two sets of cases may be configured so that the difference in the gloss value between the thicker portion and the thinner portion may be greater when the thicker portion has a lower gloss level than the thinner portion.

Some of the examples herein describe textured cover members and their properties. However, the discussion herein with respect to properties of textured cover members also relates more generally to textured components of electronic devices. These and other embodiments are discussed below with reference to FIGS. 1A-10. However, those skilled in the art will readily appreciate that the detailed description given herein with respect to these figures is for explanatory purposes only and should not be construed as limiting.

FIG. 1A shows a front view of an example of an electronic device 100 having an enclosure including a textured glass component. The electronic device 100 may be a mobile telephone (also referred to as a mobile phone). In additional embodiments, the electronic device 100 may be a notebook computing device (e.g., a notebook or laptop), a tablet computing device (e.g., a tablet), a portable media player, a wearable device, or another type of portable electronic device. The electronic device 100 may also be a desktop computer system, computer component, input device, appliance, or virtually any other type of electronic product or device component.

As shown in FIG. 1A, the electronic device 100 has an enclosure 110 including a cover assembly 122. A cover assembly, such as cover assembly 122 or 124 (shown in FIG. 1B), may simply be referred to herein as a cover. The cover assembly 122 further includes a cover member 132. The cover member 132 may extend laterally across the cover assembly 122, such as substantially across the width and the length of the cover assembly 122. In additional cases, a cover assembly may include multiple cover members that together substantially extend laterally across the cover assembly. The cover assembly 122 may further include one or more coatings. For example, the cover assembly may include an oleophobic coating and/or an anti-reflective coating exterior. The cover assembly may also include an interior masking layer.

An exterior surface of the cover assembly 122 may at least partially define a front surface 102 of the electronic device. In the example of FIG. 1A, the cover assembly 122 defines a substantial entirety of the front surface 102 and may therefore be referred to as a front cover assembly. The cover assembly is positioned over a display 144 and the enclosure 110 may at least partially surround the display 144. Typical cover assemblies described herein are thin, and typically include a cover member that is less than 5 mm in thickness, and more typically less than 3 mm in thickness, less than or equal to 2 mm in thickness, or less than or equal to 1 mm in thickness.

Figure 1B:
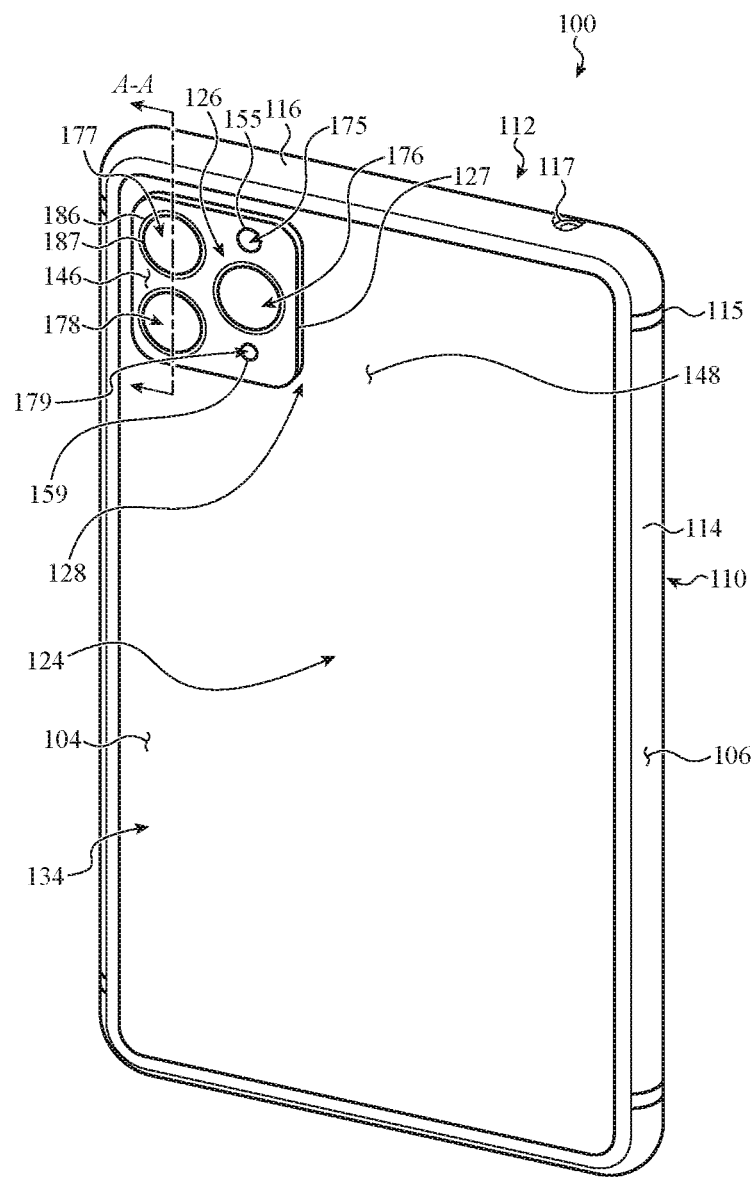
FIG. 1B shows a rear view of the electronic device of FIG. 1A.

Although the cover assembly 122 is shown in FIG. 1A as being substantially planar, the principles described herein also relate to cover assemblies and cover members which define a surface protrusion (such as shown in FIG. 1B), a surface recess, and/or one or more curved surfaces. In some embodiments, a cover member may be three-dimensional or define a contoured profile. For example, a cover member may define a peripheral portion that is not coplanar with respect to a central portion. The peripheral portion may, for example, define a side wall of an electronic device enclosure, while the central portion defines a front surface (which may define a transparent window that overlies a display).

Portions of the cover member 132 positioned over a display 144 may be substantially transparent to visible light. Further, the cover member 132 may include one or more openings or through-holes. In the example of FIG. 1A, the cover member 132 includes an opening 123 which defines a speaker port. In some aspects, the cover member 132 can have a thickness from about 0.1 mm to 2 mm or from 0.2 mm to 1 mm.

In some cases, the cover member 132 may have a substantially uniform texture along its exterior surface. For example, the cover member 132 may have a smooth texture and may be substantially transparent to visible light. Typically portions of the cover member positioned over the display are substantially transparent to visible light.

Figure 8:
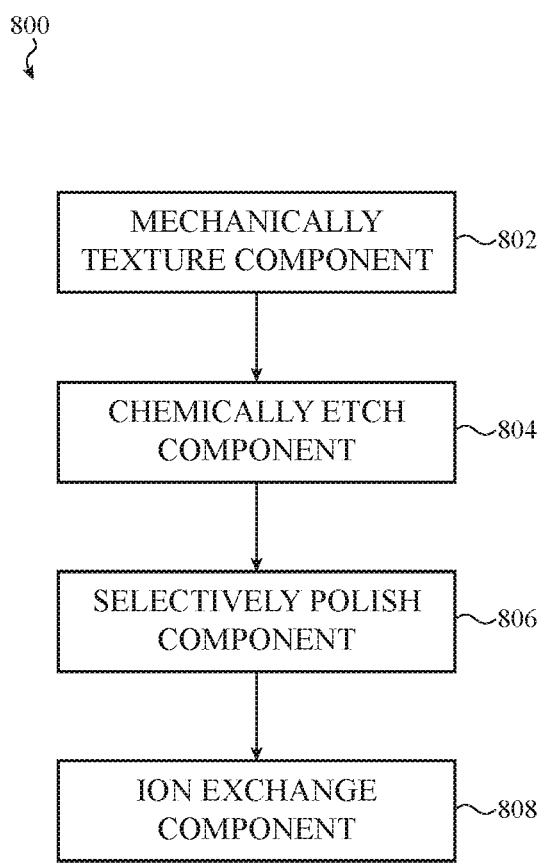
FIG. 8 shows a flow chart of an example process for forming a textured cover component.
Figure 9:
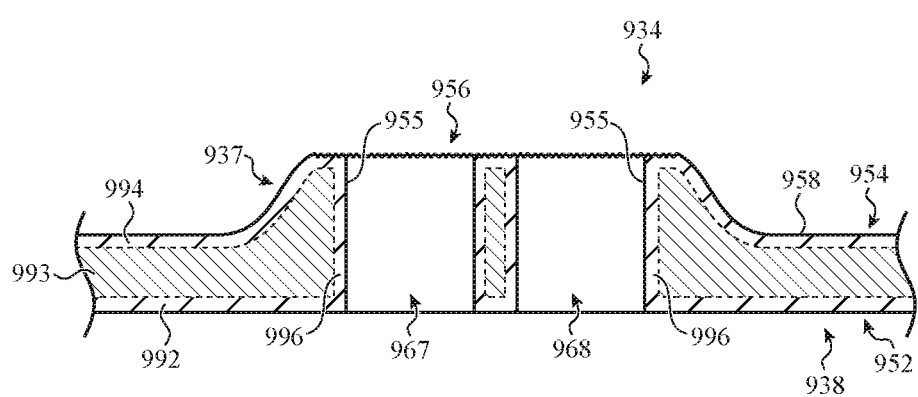
FIG. 9 schematically shows a textured cover member after chemical strengthening.

In some cases, a cover member, such as the cover member 132 and/or the cover member 134, may be a glass member, a glass ceramic member, or a member comprising one or more glass portions and one or more glass ceramic portions. In some cases, the cover member 132 may include multiple layers, each layer selected from a glass layer, a glass ceramic layer, and a polymer layer. The cover member may be a glass member when the primary structural members of the enclosure are all formed from glass. A cover member, such as the cover member 132 and/or the cover member 134, is typically chemically strengthened by ion exchange. The discussion of chemical strengthening provided with respect to FIGS. 8 and 9 is generally applicable herein and, for brevity, is not repeated here.

As shown in FIG. 1A, the enclosure 110 further includes a housing member 112, which for simplicity may also be referred to herein as a housing. The cover assembly 122 may be coupled to the housing member 112. For example, the cover assembly 122 may be coupled to the housing member with an adhesive, a fastener, an engagement feature, or a combination thereof.

The housing member 112 may at least partially define a side surface 106 of the electronic device 100 and may include one or more metal members. In the example of FIG. 1A, the housing member 112 defines all four sides or a continuous side surface 106 of the electronic device 100. As shown in FIG. 1A, the housing member 112 is formed from a series of metal segments (114, 116) that are separated by dielectric segments 115 that provide electrical isolation between adjacent metal segments. For example, a dielectric segment 115 may be provided between a pair of adjacent metal segments. One or more of the metal segments (114, 116) may be coupled to internal circuitry of the electronic device 100 and may function as an antenna for sending and receiving wireless communication. The dielectric segments may be formed from one or more dielectric materials such as a polymer, a glass, or a ceramic material. In additional implementations the housing member may include one or more glass members, one or more glass ceramic members, or one or more ceramic members. The opening 117 may allow (audio) input or output from a device component such as a microphone or speaker or may contain an electrical port or connection.

FIG. 1B shows a rear view of the electronic device 100. As shown in FIG. 1B, the enclosure 110 includes a cover assembly 124. The cover assembly 124 further includes a cover member 134. The cover member 134 may extend laterally across the cover assembly 124, such as substantially across the width and the length of the cover assembly 124. In additional cases, a cover assembly may include multiple cover members that together substantially extend laterally across the cover assembly. The cover assembly 124 may further include one or more coatings, such an oleophobic exterior coating and/or a cosmetic interior coating.

An exterior surface of the cover assembly 124 may at least partially define a rear surface 104 of the electronic device 100. In the example of FIG. 1B, the exterior surface of the cover assembly 124 defines a substantial entirety of the rear surface 104 and may therefore be referred to as a rear cover assembly. The portion 128, which extends from exterior to the interior surface of the cover assembly 124, may define a region 148 of the exterior surface of the cover assembly 124. The region 148 may also be referred to herein as a surface region, an exterior surface region or as a first or a base surface/exterior surface region. The portion 126, which also extends from the exterior to the interior surface of the cover assembly 124, may define a region 146 of the exterior surface of the cover assembly 124. The region 146 may also be referred to herein as a surface region, an exterior surface region or as a second or raised surface/exterior surface region.

Figure 7:
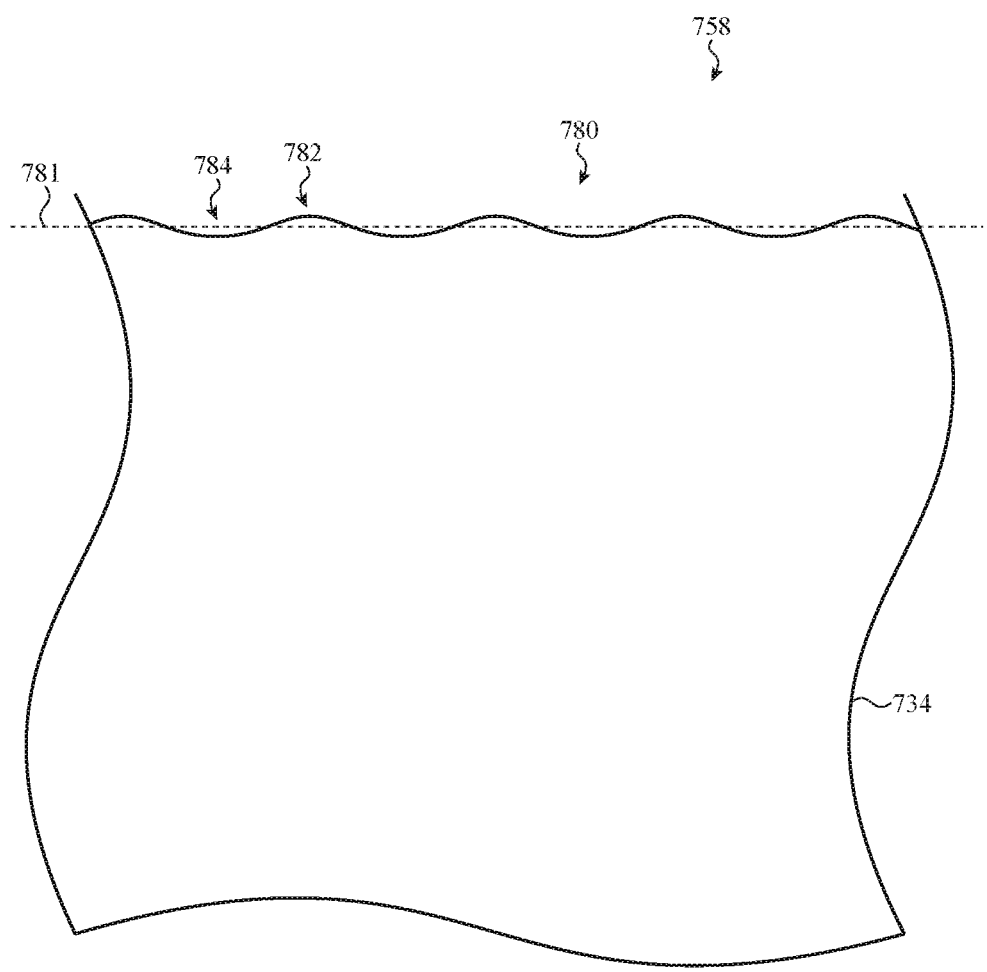
FIG. 7 shows an example of a detailed cross-section view of a second textured surface region of the cover member of FIG. 5.

In some cases, a texture of the surface region 146 differs from a texture of the surface region 148. The differently textured surface regions of the cover assembly 124 may produce optical contrast between different portions of the cover assembly 124. In some cases, the differently textured surface regions may produce different gloss levels, different amounts of translucency, or both. For example, the portion 126 of the cover assembly 124 may have a lower gloss level and a higher amount of translucency (lower amount of light transmitted) than the portion 128 due at least in part to the differences in texture between the surface regions 146 and 148. This example is not intended to be limiting and in other examples the portion 128 may have a lower gloss and/or a higher amount of translucency than the portion 126. The description of textured surface regions provided with respect to FIGS. 5 to 7 is generally applicable herein and, for brevity, is not repeated here.

The portion 126 of the cover assembly 124 may be thicker than the portion 128. As shown in the example of FIG. 1B, the portion 126 defines a feature 127 which protrudes with respect to the surface region 148 and may also be referred to herein as a protruding feature. The feature 127 defines the surface region 146. In the example of FIG. 1B, the surface region 146 defines a substantially plateau-shaped top of the feature 127. The plateau defined by the surface region 146 may be substantially parallel to the surface region 148.

The thickness of the portion 126 of the cover assembly 124 including the feature 127 may be greater than that of the portion 128 and may be at least 10%, 25%, or 50% and up to about 250% thicker than the thickness of the portion 128. In some cases, the thickness of the thicker portion of the cover assembly (including the protruding feature) is greater than about 1 mm and less than or equal to about 2 mm or about 2.5 mm. The thickness of the portion 128 may be greater than about 0.3 mm and less than about 0.75 mm or greater than about 0.5 mm and less than about 1 mm. The amount of protrusion or offset between the surface region 146 and the surface region 148 may be from about 0.5 mm to about 1.5 mm or from about 0.75 mm to about 2 mm. The size of the feature 127 may depend at least in part on the size of a camera assembly or other device component underlying the protruding feature. In some embodiments, a lateral dimension (e.g., a width) of the protruding feature may be from about 5 mm to about 30 mm, from about 10 mm to about 20 mm, or from about 15 mm to 30 mm.

The cover assembly 124 may define one or more holes extending though its thickness to facilitate positioning of one or more device components. In some cases, the holes are defined by the thicker portion 126 of the cover assembly. In the view of FIG. 1B, the openings 155 and 159 of the holes are visible, while the openings to other holes are obscured by windows (e.g., window 187) and the retaining components 186 which hold the windows in place. For example, the retaining component 186 may be a ring, such as a metal ring, which contacts the surface region 146. However, this example is not limiting and in some cases windows may be provided over a fewer number of device components or a greater number of device components than shown in the example of FIG. 1B.

The shape of the cover member 134 may have a shape similar to that of the cover assembly 124. For example, the cover member 134 may also include a thicker portion defining a feature that protrudes with respect to a thinner portion, as shown in more detail in the cross-section view of FIG. 5 (e.g., the feature 537 of FIG. 5).

The electronic device 100 includes device components 175, 176, 177, 178, and 179 extending at least partially into the feature 127. As an example, the device components 176, 177, and 178 are optical modules such as camera modules or a combination of camera modules and optical sensor modules, the device component 175 is an illumination module, and the device component 179 is a sensor module or a sensor array such as a microphone sensor module.

Typically, the electronic device 100 includes a camera assembly which in turn includes one or more optical modules. The example of FIG. 1B shows optical modules 175, 176, 177, and 178 of a camera assembly. More generally, the camera assembly may define any number of optical modules such as one, two, three, four, five, or six optical modules. Each of the optical modules 175, 176, 177, and 178 may be substantially flush with, proud of, or recessed with respect to the raised region 146.

The optical modules 175, 176, 177, and 178 may include, but are not limited to, a camera module, an illumination module, a sensor, and combinations thereof. When the camera assembly includes multiple camera modules, each of the camera modules may have a different field of view or other optical property. In some cases, a camera module includes an optical sensor array and/or an optical component such as a lens, filter, or window. In additional cases, a camera module includes an optical sensor array, an optical component, and a camera module housing surrounding the optical sensor array and the optical components. The camera module may also include a focusing assembly. For example, a focusing assembly may include an actuator for moving a lens of the camera module. In some cases, the optical sensor array may be a complementary metal-oxide semiconductor (CMOS) array or the like. In some cases, a sensor array for a camera assembly may include a depth measuring sensor (e.g., a time of flight sensor), an ambient light sensor, an infrared sensor, an ultraviolet light sensor, a health monitoring sensor, a biometric sensor (e.g., a fingerprint sensor) or the like.

Figure 10:
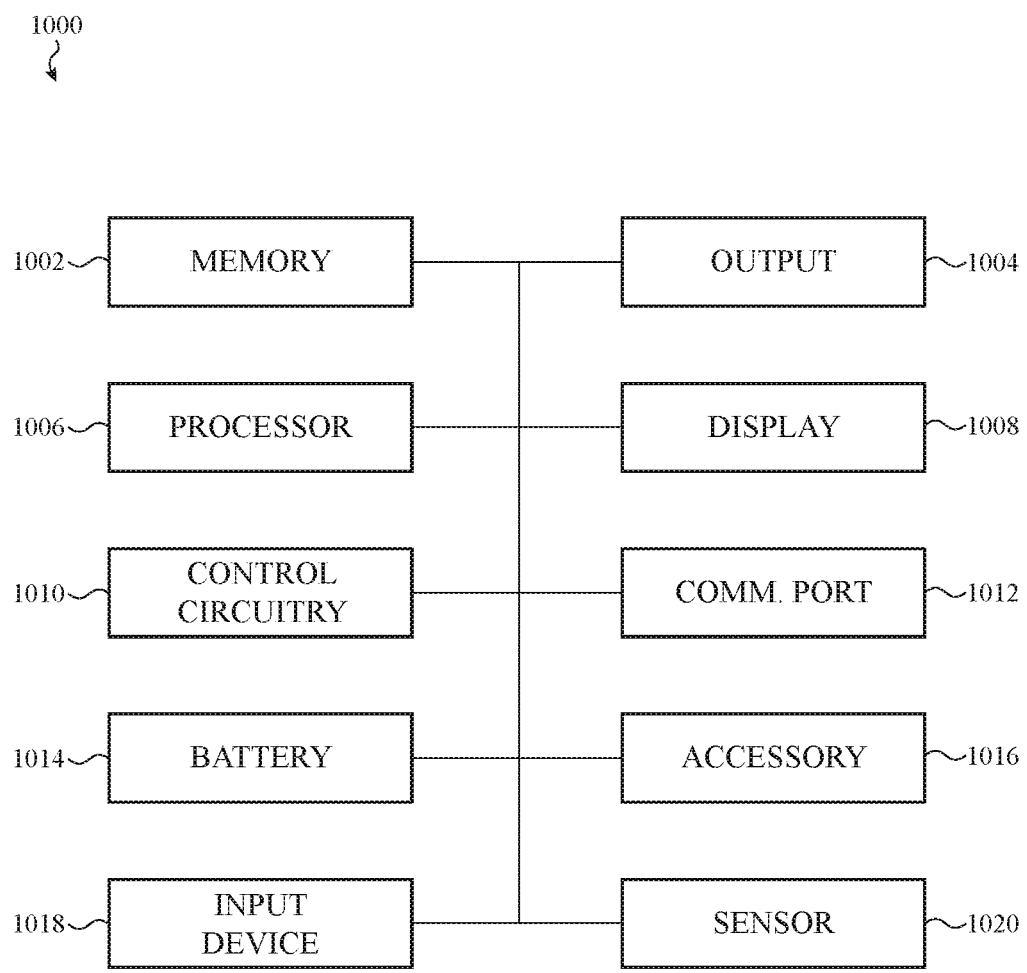
FIG. 10 shows a block diagram of a sample electronic device that can incorporate a textured glass component.

The example of FIG. 1B also shows an additional electronic device component 179 positioned within or below the opening 159. For example, the electronic device component 179 may be a microphone or another type of sensor. A variety of sensors may be positioned within and/or adjacent to the feature 127. For example, a health monitoring sensor may be positioned at least partially within or adjacent to a protruding feature of a wearable device, such as a watch. As another example, a protruding feature may define a key region, a button region, or a trackpad region of a laptop or a phone. A biometric sensor, a touch sensor, a proximity sensor or the like may be positioned within or adjacent to the protruding feature. The description of sensors provided with respect to FIG. 10 is generally applicable herein and, for brevity, is not repeated here.

In additional examples, the feature 127 need not include an opening for the additional electronic device component 179. In this case, the sensor assembly for the additional electronic device component 179 may be positioned along an interior surface of the cover assembly below the feature 127.

In addition to a display and a camera assembly, the electronic device 100 may include additional components. These additional components may comprise one or more of a processing unit, control circuitry, memory, an input/output device, a power source (e.g., battery), a charging assembly (e.g., a wireless charging assembly), a network communication interface, an accessory, and a sensor. Components of a sample electronic device are discussed in more detail below with respect to FIG. 10 and the description provided with respect to FIG. 10 is generally applicable herein.

Figure 2:
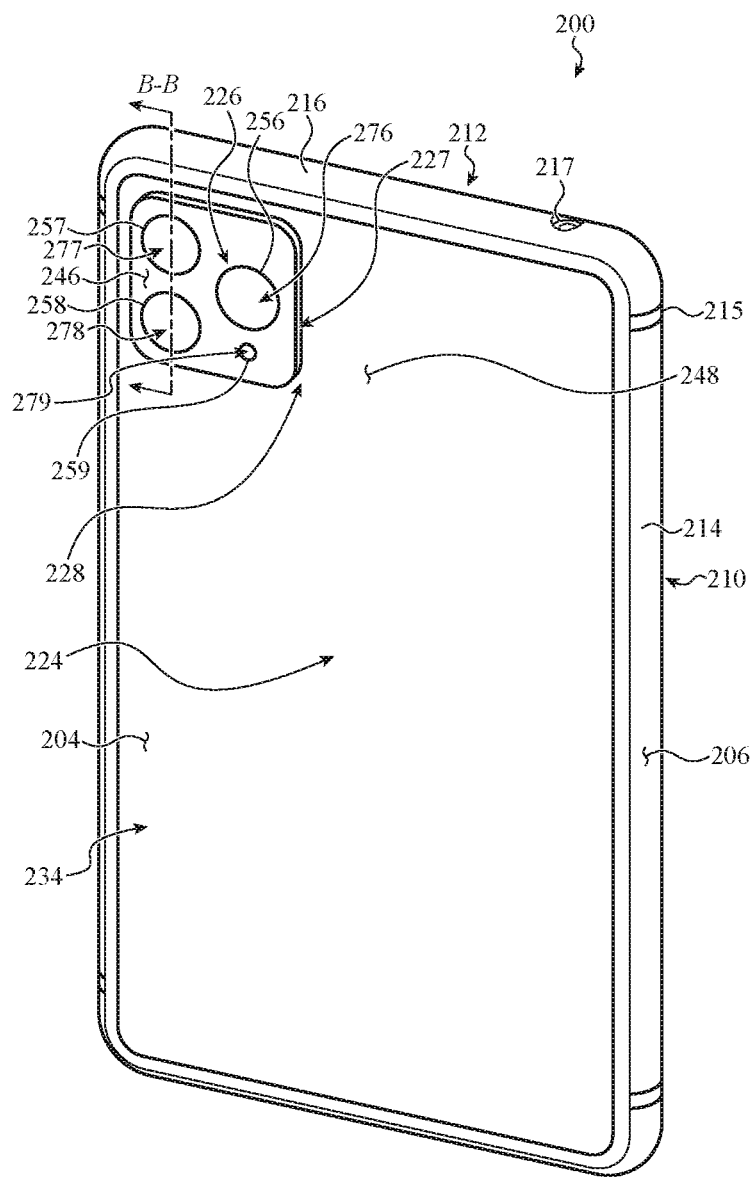
FIG. 2 shows a rear view of another electronic device.

FIG. 2 shows a rear view of another electronic device 200. As shown in FIG. 2, the enclosure 210 includes a cover assembly 224, which defines a rear surface 204 of the electronic device 200. The cover assembly 224 further includes a cover member 234. The cover member 234 may be similar to the cover member 124 described with respect to FIG. 1B and, for brevity, those details are not repeated here.

In the example of FIG. 2, the exterior surface of the cover assembly 224 defines a substantial entirety of the rear surface 204 and may therefore be referred to as a rear cover assembly. The portion 228 of the cover assembly 224 may define a surface region 248 and the portion 226 of the cover assembly 224 may define a surface region 246.

In some cases, a texture of the surface region 246 differs from a texture of the surface region 248. The differently textured surface regions of the cover assembly 224 may produce optical contrast between different portions of the cover assembly 224. In some cases, the differently textured surface regions may produce different gloss levels, different amounts of translucency, or both. The description of texture surface regions provided with respect to FIGS. 5 to 7 is generally applicable herein and, for brevity, is not repeated here.

The portion 226 of the cover assembly 224 may be thicker than the portion 228. As shown in the example of FIG. 2, the portion 226 defines a feature 227 which protrudes with respect to the region 248. The feature 227 defines the surface region 246. In the example of FIG. 2, the surface region 246 defines a substantially plateau-shaped top of the feature 227.

The cover assembly 224 may define one or more holes extending though its thickness to facilitate positioning of one or more device components. In some cases, the holes are defined by the thicker portion 226 of the cover assembly. In the example of FIG. 2, the holes define openings 256, 257, 258, and 259 in the surface region 246.

The example of FIG. 2 shows optical modules 276, 277, and 278 of a camera assembly. More generally the camera assembly may define any number of optical modules such as one, two, three, four, five, or six optical modules. As an example, each of the optical modules 276, 277, and 278 is a camera module, an optical sensor module, or an illumination module and the device component 279 is a sensor such as a microphone. The description of device components such as optical modules and sensors provided with respect to FIG. 1B is generally applicable here and, for brevity, is not repeated here.

Figure 3:
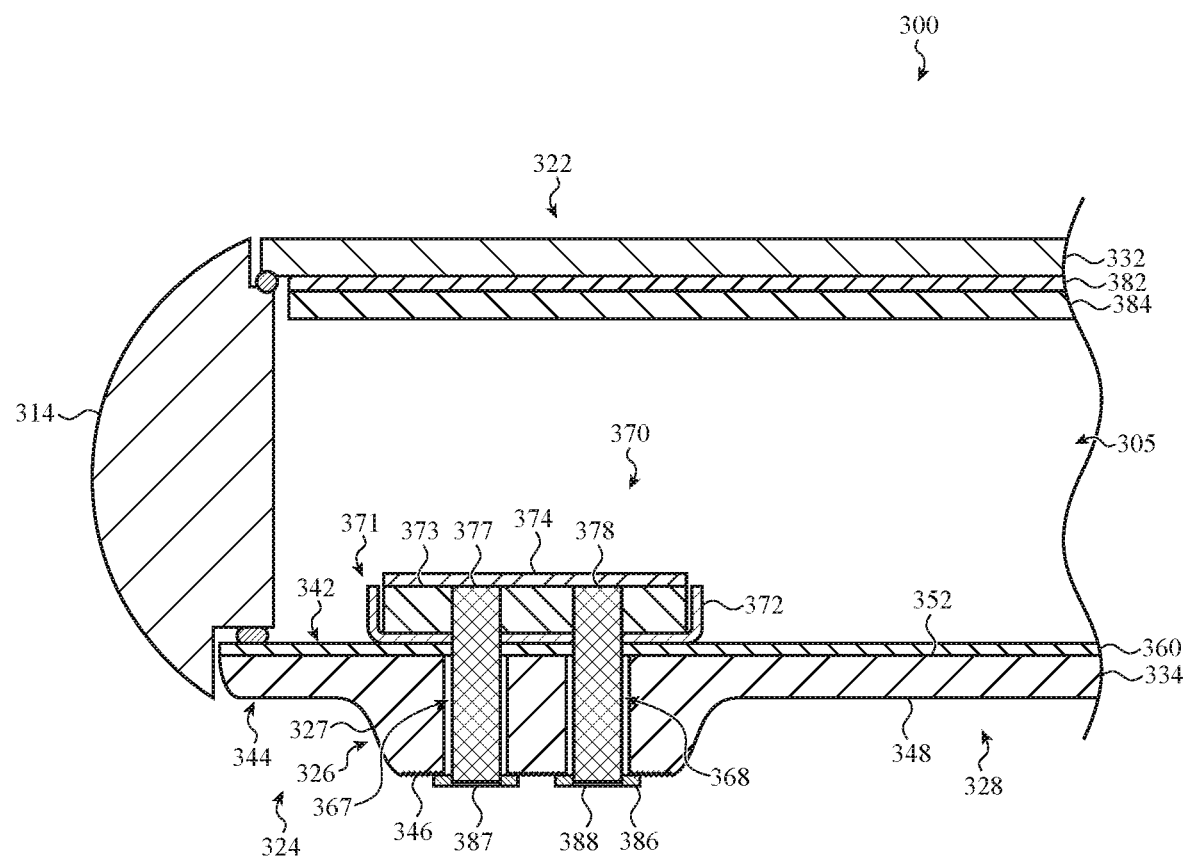
FIG. 3 shows a partial cross-section view of an electronic device.
Figure 4:
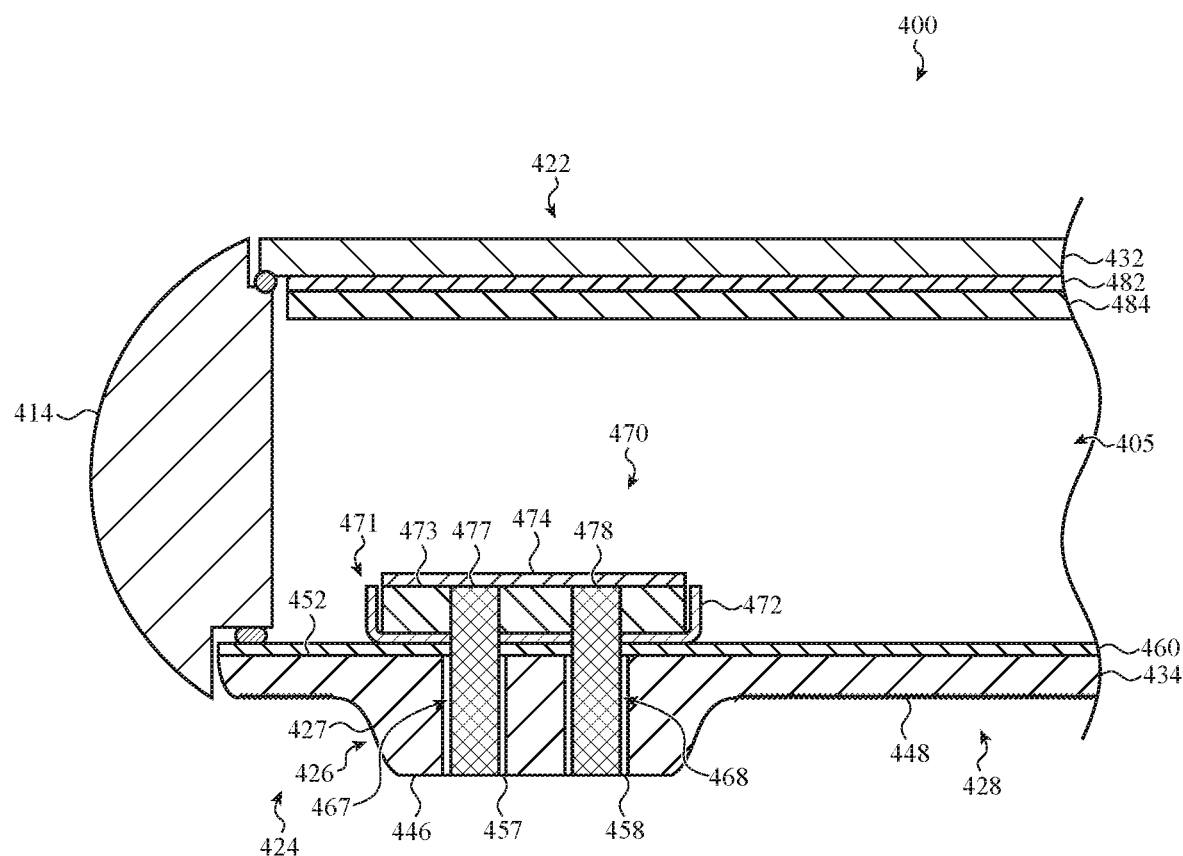
FIG. 4 shows a partial cross-section view of an additional electronic device.

An optical module, such as the optical modules 276, 277, and 278 may be positioned at least partially within a hole in the cover assembly 224 (as shown in the partial cross-section view of FIGS. 3 and 4). An optical module, such as the optical module 277, may also be positioned within an opening to the hole as shown in the partial cross-section view of FIG. 4. Each of the optical modules 276, 277, and 278 may be substantially flush with, proud of, or recessed with respect to the raised region 246. In some cases, one or more of the optical modules 276, 277, and 278 may include a window as part of its optical components, with the window being positioned within its housing. The windows may protect underlying components (e.g., cameras, lenses, other sensors), and may define part of the exterior surface of the cover assembly. In additional examples, a window may be provided over one or more of the optical components and sensors as previously illustrated with respect to FIG. 1B. The camera assembly may be coupled to an interior surface of the cover assembly as shown in FIGS. 3 and 4.

The housing member 212 may at least partially define a side surface 206 of the electronic device 200. The housing member 212, the metal segments 214 and 216, the dielectric segments 215, and the opening 217 may be similar to the housing member 112, the metal segments 114 and 116, the dielectric segments 115, and the opening 117 and for brevity those details are not repeated here.

FIG. 3 shows a partial cross-section view of an electronic device 300 including an example rear cover assembly and a camera assembly. The electronic device 300 may be similar to the electronic device 100 of FIGS. 1A and 1B and the cross-section may be taken along A-A of FIG. 1B. The electronic device 300 includes a cover assembly 322 at the front and a cover assembly 324 at the rear of the electronic device 300.

The cover assembly 322 includes cover member 332 and the cover assembly 324 includes a cover member 334. Each of the cover member 332 and the cover member 334 may be a glass member, a glass ceramic member, or a member comprising one or more glass portions and one or more glass ceramic portions. Each of the cover member 332 and the cover member 334 may include an external coating, an internal coating, or a combination thereof. FIG. 3 shows a coating 360 provided along an internal surface 352 of the cover member 334. In some cases the coating 360 may provide the cover assembly 334 with a desired color. In additional cases, the coating 360 may function as a masking layer.

The exterior surface of the cover assembly 324 includes two different surface regions 346 and 348. In the example of FIG. 3, the surface region 346 and the surface region 348 are textured differently. In particular, the surface region 346 has a rougher texture than the surface region 348 and may have a lower gloss value. However, this example is not limiting and in some cases the surface region defined by the thicker portion may have a smoother texture than the surface region defined by the thinner portion of the cover assembly, an example of which is shown in FIG. 4. The description of textured surface regions provided with respect to FIGS. 5 to 7 is generally applicable herein and, for brevity, is not repeated here.

In the example of FIG. 3, the cover assembly 324 includes a thicker portion 326 and a thinner portion 328. The thicker portion 326 defines the surface region 346 and the thinner portion 328 defines the surface region 348. The thicker portion 326 also defines a feature 327 that protrudes with respect to the surface region 348. A feature which protrudes with respect to another portion of the cover assembly may also be referred to generally herein as a protruding feature. Typically at least part of the surface region 348 and the portion 328 of the cover assembly 324 is substantially adjacent the protruding feature 327. The portion 328 may also be referred to herein as a base portion and the surface region 348 as a base region. The surface region 346 of the exterior surface protrudes or is raised with respect to the region 348 and may therefore be referred to as a raised region, an offset region, an outer region, or simply as a top surface of the protruding feature 327. As an example, the raised surface region 346 may substantially define a plateau.

As previously described with respect to FIG. 1B, the cover assembly 324 defines holes extending through the portion 326 and the protruding feature 327. The cross-section view of FIG. 3 shows holes 367 and 368, which may also be referred to herein as through-holes. The openings to the holes are located in the surface region 346, which may be a textured region.

The cover member 334 may also include a protruding feature as shown in more detail in the cross-section views of FIG. 5 (e.g., the protruding feature 537 of FIG. 5). As previously described for cover assembly 224, the protruding feature of the member 334 may be part of a thicker portion of the member as compared to an adjacent portion of the member 334. As shown in FIG. 3, the member 334 also at least partially defines the holes 367 and 368.

The electronic device 300 further includes a camera assembly 370. The partial cross-section view of FIG. 3 shows two optical modules (377, 378) of the camera assembly 370. As shown in FIG. 3, the camera assembly 370 is coupled to the coating 360. In examples where the coating 360 does not extend under the protruding feature, the camera assembly 370 may be coupled more directly to the interior surface of the member 334. In some cases, the camera assembly 370 may be coupled to the interior surface 342 of the cover assembly 324 with an adhesive bond, as may be provided by an adhesive layer. As an additional example, the camera assembly 370 may be coupled to the interior surface of the cover assembly 324 with a fastener or other form of mechanical attachment.

The camera assembly 370 further includes a support structure 371. The support structure 371 may be configured to hold various elements of the camera assembly 370 in place. For example, each of the optical modules 377 and 378 may be mounted to the support structure 371. In the example of FIG. 3, the support structure 371 includes a bracket 372 that has a non-planar profile. The shape of the bracket 372 is not limited to the example of FIG. 3 and in other examples may have the form of a flat element. The bracket 372 may be coupled to an interior surface of the cover assembly 324. In the example of FIG. 3, the support structure 371 also includes a frame 373 which nests at least partially within the bracket 372 and supports a circuit assembly 374, which may be mounted on a printed circuit board. However this example is not limiting and in additional embodiments the frame 373 may be omitted.

The support structure 371 and the coupling between the camera assembly 370 and the interior surface of the cover assembly 324 may be configured to limit bending of the cover member 334 in the vicinity of the protruding feature 327. For example, the support structure 371 may be configured to limit bending that would tend to increase outwards curvature of the surface region 346 (and increase its convexity). Limiting bending of the protruding region can limit bending-induced tensile stress along the surface region 346. Further, the coupling between the camera assembly 370 and the interior surface of the cover assembly 324 may be sufficiently rigid so that the position of a neutral axis of the combination of the cover assembly 324 and the camera assembly 370 is shifted as compared to the corresponding neutral axis of the cover assembly 324 alone. For example, the neutral axis of the combination of the cover assembly 324 and the camera assembly 370 may be shifted inward, away from the exterior surface 344, as compared to the corresponding neutral axis of the cover assembly 324 alone. In some cases, the shifting of the neutral axis may be most pronounced in the protruding feature 327 of the cover assembly 324.

The first optical module 377 and the second optical module 378 are respectively aligned with the holes 367 and 368. As shown in FIG. 3, the first optical module 377 extends substantially through the hole 367 and the second optical module 378 extends substantially through the hole 368. In the example of FIG. 3, an end of each of the optical modules 377 and 378 extends beyond (protrudes beyond) the surface region 346. In additional examples, an end of an optical module may be flush or recessed with respect to the surface region 346, as shown in FIG. 4. In some cases, an electronic device may include at least one optical module that is flush with or extends beyond the surface region 346 and another optical module that is recessed with respect to the surface region 346.

As previously described with respect to FIGS. 1B and 2, an optical module may comprise a camera module, an illumination module, an optical sensor or the like. Typically the camera assembly 370 includes at least one camera module and may include two, three, four or five camera modules. The camera module is electrically connected to the circuit assembly 374. As shown in FIG. 3, separate windows 387 and 388 are provided over the through-holes 367 and 368 and the retaining components 386 hold the windows 387 and 388 in place. For example, the retaining component 386 may be a ring, such as a metal ring, which surrounds the end of the optical module. Alternately, an optical module may include a window as part of its optical components, with the window being positioned within its housing. The windows may protect underlying components (e.g., cameras, lenses, other sensors), and may define part of the exterior surface of the cover assembly.

The cover assembly 324 further includes a coating 360 disposed along an interior surface 352 of the cover member 334. In some cases, the coating may be a cosmetic or decorative coating. The coating 360 may define an interior surface of the cover assembly. When the cover assembly 324 includes a textured region, the appearance of the electronic device may be due to the combined effect of the textured region and the coating 360. As shown in FIG. 3, the coating 360 is positioned underneath both the portions 326 and 328 of the cover assembly 324.

In some cases, the coating 360 may provide one or more portions of the cover assembly 324 with a desired color. For example, the coating 360 may define a color visible along one or more surfaces of the cover assembly 324 or the cover member 334. In additional cases, the coating 360 may function as a masking layer. In the example of FIG. 3, the portion 326 may have a color different from or similar to the portion 328. In some cases, differently textured portions of the cover assembly 324 may have substantially different L* values.

In some cases, the coating 360 comprises a polymer. The coating 360 may comprise at least 40%, 50%, 60%, or 70% of the polymer and may therefore be referred to as a polymer-based coating or a polymeric coating. When the coating 360 further comprises a colorant, the polymer may act as a binder for the colorant. The colorant (e.g., a pigment) may be substantially dispersed in a matrix of the polymer. As examples, the polymer may be polyester-based, epoxy-based, urethane-based, or based on another suitable type of polymer or copolymer. The coating 360 may further comprise optional additives such as one or more extenders, diluents, polymerization initiators, and/or stabilizers. In some embodiments, the polymer has a cross-linked structure.

In some cases, the coating may include a color layer (e.g., an ink, dye, paint, etc.) and/or a metal layer. As previously described, the coating 360 may include at least one color layer. The color layer may comprise a polymer and a colorant dispersed in the polymer and may be transparent, translucent, or opaque. More generally, any pigment, paint, ink, dye, sheet, film, or other layer may be used as the coating 360 or a portion thereof. In some embodiments, the coating 360 is a multilayer coating that includes a first color layer and a second color layer. Each of the color layers may be transparent, translucent, or opaque. Each of the color layers may include the same colorant or different color layers may include different colorants. The thickness of each of the color layers in the coating 360 may be from about 2 microns to about 10 microns.

The color layer(s) and the coating 360 may have a chromatic color or an achromatic color. The color of the coating 360 may be characterized using a color model. For example, in the hue-saturation-value (HSV) color model, the hue relates to the wavelength(s) of visible light observed when the color feature is viewed (e.g., blue or magenta) and the value relates to the lightness or darkness of a color. The saturation relates to the perceived colorfulness as judged in proportion to its brightness. As another example, coordinates in CIEL*a*b* (CIELAB) color space may be used to characterize the color, wherein L* represents brightness, a* the position between red/magenta and green, and b* the position between yellow and blue.

In some cases, the coating 360 may include multiple layers. As examples, the coating 360 may include one or more color layers, a metal layer, an optically clear layer, an optically dense layer, and combinations thereof. In additional cases, the coating need not include a color layer, but may include one or more of an optically dense layer and a metal layer.

For example, the coating 360 may include an optically dense layer. The optically dense layer may substantially reduce or prevent transmission of visible light, thereby "blocking" the view through the cover assembly 324 of components positioned behind the optically dense layer. In addition, the optical properties of the optically dense layer may be configured to adjust the lightness and/or the chroma of the coating 360.

For example, the optical density of the optically dense layer may be described by $OD=\log_{10}$ (initial intensity/transmitted intensity) and may be greater than or equal to 1, greater than or equal to 2, or greater than or equal to 3. Generally, the optically dense layer comprises a polymer. The optically dense layer may further comprise one or more pigments, dyes, or a combination thereof. As an example, the optically dense layer has a substantially wavelength independent (neutral) reflectance and/or absorption spectrum over the visible range. In addition, the optically dense layer may have an achromatic characteristic color. The thickness of the optically dense layer may be from about 2 microns to about 10 microns.

In further embodiments, the coating 360 may comprise a metal layer in addition to one or more color layers. Such a metal layer may give a metallic effect to the coating as seen through the cover assembly 324. When used to form a metallic marking, the metal layer may be a partial layer (e.g., having a smaller lateral dimension than a color layer). For example, the metal of the layer may be selected from aluminum, copper, nickel, silver, gold, platinum, and alloys thereof. In some cases, the metal layer may be configured to at least partially transmit visible light. For example, the metal layer may have a thickness greater than about 0.5 nm and less than 10 nm, less than 5 nm, less than 3 nm, less than 2 nm, or less than 1 nm. Thicker metal layers may be used for forming an indicium or another marking under the member. The marking may be in the form of an image, a pattern, text, a glyph, a symbol, indicia, a geometric shape, or a combination thereof.

The metal layer may be disposed along an interior surface 352 of the member 334. In some cases the metal layer may be used in combination with an optically clear layer. The optically clear layer may have one or more mechanical properties (e.g., modulus, hardness and/or toughness) that limit or prevent propagation of cracks from the metal layer into the member 334. The optically clear layer may be a polymeric layer and may have a thickness from about 1 micron to about 5 microns. The optically clear layer may be disposed along the interior surface 352 of the member 334, the metal layer may be positioned between the optically clear layer and the optically dense layer, a first color layer may be positioned between the metal layer and the optically dense layer, and a second color layer may be positioned between the first color layer and the optically dense layer.

In addition, the coating may comprise additional polymeric layers behind and disposed along the optically dense layer. If components of the electronic device are glued to the coating, these additional layers may include a protective layer that protects the color layers of the multilayer coating from damage due to the glue. The additional layers may further include a layer inwards of the protective layer that facilitates adhesion of the coating to the glue.

The electronic device 300 further includes a display 384 and a touch sensor 382 provided below the front cover assembly 322. The display 384 and the touch sensor 382 may be coupled to the front cover assembly 322. The display 384 may be a liquid-crystal display (LCD), a light-emitting diode (LED) display, an LED-backlit LCD display, an organic light-emitting diode (OLED) display, an active layer organic light-emitting diode (AMOLED) display, and the like. The touch sensor 382 may be configured to detect or measure a location of a touch along the exterior surface of the front cover assembly 322.

Each of the cover assembly 322 and the cover assembly 324 is coupled to a housing component 314, such as with an adhesive, a fastener, or a combination thereof. The housing component 314 may be similar to the housing component 114 of FIG. 1A. The housing component 314 at least partially defines an interior cavity 305 of the electronic device 300.

FIG. 4 shows a partial cross-section view of an electronic device 400 including an example rear cover assembly and a camera assembly. The electronic device 400 may be similar to the electronic device 200 of FIG. 2 and the cross-section may be taken along B-B. The electronic device 400 includes a cover assembly 422 at the front and a cover assembly 424 at the rear of the electronic device 400.

The cover assembly 422 includes cover member 432 and the cover assembly 424 includes a cover member 434. Each of the cover member 432 and the cover member 434 may be a glass member, a glass ceramic member, or a member comprising one or more glass portions and one or more glass ceramic portions.

Each of the cover members 432 and the cover member 434 may include an external coating, an internal coating, or a combination thereof. FIG. 4 shows a coating 460 provided along an internal surface 452 of the cover member 434. In some cases, the coating 460 may provide a desired color by defining a color visible along one or more surfaces of the cover member 434 and the cover assembly 424. In additional cases, the coating 460 may function as a masking layer.

The exterior surface of the cover assembly 424 includes two different surface regions 446 and 448. In the example of FIG. 4, the surface region 446 and the surface region 448 are textured differently. In particular, the surface region 446 has a smoother texture than the surface region 448 and may have a higher gloss value. However, this example is not limiting and in some cases the surface region defined by the thicker portion may have a rougher texture than the surface region defined by the thinner portion of the cover assembly, an example of which is shown in FIG. 3. The description of textured surface regions provided with respect to FIGS. 5 to 7 is generally applicable herein and, for brevity, is not repeated here.

In the example of FIG. 4, the cover assembly 424 includes a thicker portion 426 and a thinner portion 428. The thicker portion 426 defines the surface region 446 and the thinner portion 428 defines the surface region 448. The thicker portion 426 also defines a feature 427 that protrudes with respect to the surface region 448. Typically at least part of the surface region 448 and the portion 428 of the cover assembly 434 is substantially adjacent the protruding feature 427. The portion 428 may also be referred to herein as a base portion and the surface region 448 as a base region. The surface region 446 of the exterior surface protrudes or is raised with respect to the region 448 and may therefore be referred to as a raised region, an offset region, an outer region, or simply as a top surface of the protruding feature 427. As an example, the raised surface region 446 may substantially define a plateau.

As previously described with respect to FIGS. 1B, 2, and 3, the cover assembly 424 defines holes extending through the portion 426 and the protruding feature 427. The cross-section view of FIG. 4 shows holes 467 and 468, which may also be referred to herein as through-holes. The cover assembly 424 further defines openings 457 and 458 to the holes 467 and 468. The openings 457 and 458 are located in the region 446.

The cover member 434 may also include a protruding feature as shown in more detail in the cross-section views of FIG. 5 (e.g., the protruding feature 537 of FIG. 5). Similarly to the cover assembly 224, the protruding feature of the cover member 434 may be part of a thicker portion of the cover member as compared to an adjacent portion of the cover member 434. As shown in FIG. 4, the member 434 also at least partially defines the holes 467 and 468.

The electronic device 400 further includes a camera assembly 470. The partial cross-section view of FIG. 4 shows two optical modules (477, 478) of the camera assembly 470. As shown in FIG. 4, the camera assembly 470 is coupled to the coating 460. The description provided with respect to FIG. 3 of coatings and of additional ways of coupling the camera assembly to the cover assembly is generally applicable herein and, for brevity, are not repeated here.

The optical module 477 and the optical module 478 are respectively aligned with the holes 467 and 468. As shown in FIG. 4, the optical module 477 extends substantially through the hole 467 and the optical module 478 extends substantially through the hole 468. In the example of FIG. 4, an end of each of the optical modules 477 and 478 are flush with the surface region 446. In additional examples, an end of an optical module may protrude with respect to the surface region 446, as shown in FIG. 3 or may be recessed with respect to the surface region 446.

As previously described with respect to FIGS. 1B, 2, and 3, an optical module may comprise a camera module, an illumination module, an optical sensor or the like. The optical module 477 and/or 478 may include a window as part of its optical components, with the window being positioned within its housing. The windows may protect underlying components (e.g., cameras, lenses, other sensors), and may define part of the exterior surface of the cover assembly. The description of device components such as optical modules and sensors provided with respect to FIGS. 1B and 2 is generally applicable here and, for brevity, is not repeated here.

The camera assembly 470 further includes a support structure 471. The support structure 471, the bracket 472, the frame 473, and the circuit assembly 474 may be similar to the support structure 371, the bracket 372, the frame 373, and the circuit assembly 374 and, for brevity, those details are not repeated here.

The electronic device 400 further includes a display 484 and a touch sensor 482 provided below the front cover assembly 422. The display 484 and the touch sensor 482 may be similar to the display 384 and the touch sensor 382 and, for brevity, those details are not repeated here. In addition, each of the cover assembly 422 and the cover assembly 424 is coupled to a housing component 414, such as with an adhesive, a fastener, or a combination thereof. The housing component 414 may be similar to the housing component 114 of FIG. 1A. The housing component 414 at least partially defines an interior cavity 405 of the electronic device 400.

FIG. 5 shows a partial cross-section view of an example cover member 534 of an electronic device. The cover member 534 includes differently textured surface regions 556 and 558. The cover member 534 may be an example of the cover member 134 of FIG. 1B or any other cover member described herein.

A portion 538 of the cover member 534, which extends from exterior surface 554 to the interior surface 552, may define a region 558 of the exterior surface 554. The region 558 may also be referred to herein as the surface region 558, as the exterior surface region 558 or as a first or a base surface region. A portion 536 of the cover member 534, which also extends from the exterior surface 554 to the interior surface 552, may define a region 556 of the exterior surface 554. The region 556 may also be referred to herein as the surface region 556, as the exterior surface region 556, or as a second or a raised surface region. The surface region 559 may join the surface region 556 and the surface region 558.

The portion 536 of the cover member 534 may be thicker than the portion 538. As shown in the example of FIG. 5, the portion 536 defines a feature 537 which protrudes with respect to the surface region 558. The feature 537 defines the surface region 556. In the example of FIG. 5, the surface region 556 defines a substantially plateau-shaped top of the feature 537. The surface region 559 may define a side surface of the protruding feature 537. Through-holes 567 and 568 extend through the thicker portion 536 and the protruding feature 537.

The combined thickness of the portion 536 of the cover member 534 including the feature 537 may be greater than that of the portion 538 and may be at least 10%, 25%, or 50% and up to about 250% thicker than the thickness of the portion 538. In some cases, the thickness of the thicker portion of the cover member (including the protruding feature) is greater than about 1 mm and less than or equal to about 2 mm or about 2.5 mm. The thickness of the portion 538 may be greater than about 0.3 mm and less than about 0.75 mm or greater than about 0.5 mm and less than about 1 mm. The amount of protrusion or offset between the surface region 556 and the surface region 558 may be from about 0.5 mm to about 1.5 mm or from about 0.75 mm to about 2 mm. The size of the feature 537 may depend at least in part on the size of a camera assembly or other device component underlying the protruding feature. In some embodiments, a lateral dimension (e.g., a width) of the protruding feature may be from about 5 mm to about 30 mm, from about 10 mm to about 20 mm, or from about 15 mm to about 30 mm.

In the example of FIG. 5, a texture of the surface region 556 differs from a texture of the surface region 558. The differently textured surface regions of the cover member 534 may be configured to produce significant optical contrast between different portions of the cover member 534. For example, the differently textured surface regions may produce differences in gloss, translucency, or both which are readily perceptible to the eye. In addition, the differently textured surface regions may be configured to produce perceptibly different "feels". The differently textured surface regions may also be configured to meet some common performance standards. For example, the differently textured surface regions may each be configured so that they do not provide an overly rough "feel" and so that they are not overly difficult to clean. The differently textured surface regions may also be configured so that the corresponding portions of the cover member meet common performance standards. For example, the differently textured portions of the component may each have a sufficiently high light transmissivity that the color of an internal coating can be perceived through the component. In addition, the differently textured portions of the component may each have a minimum strength as measured, for example, using a ring on ring test.

In some cases, the differently textured surface regions may produce different gloss levels, different translucency values, or both. For example, the portion 536 of the cover member 534 may have a lower gloss and a higher translucency than the portion 538 due at least in part to the differences in texture between the surface regions 556 and 558. This example is not intended to be limiting and in other examples the portion 538 may have a lower gloss and/or a higher translucency than the portion 536.

In some cases, the texture of the surface region 556 has at least one roughness parameter, such as a root mean square surface height, a root mean square slope, a pitch, and/or a mean peak curvature, which is greater than that of the surface region 558. In some cases, the surface region 558 may have a smooth texture that is tactilely and/or visually distinct from that of the surface region 556. For example, the surface region 558 may have a relatively smooth texture resulting from a polishing process. In some cases, the surface region 556 may be configured to produce a gloss level that is lower than that of a window or lens of an optical module in the through-hole 567 or 568 (e.g., the window 187 of FIG. 1B). The window or lens may have a highly polished surface, with a gloss level greater than about 40 gloss units or greater than about 50 gloss units. The additional description of roughness parameters provided with respect to FIGS. 6 and 7 is generally applicable herein and, for brevity, is not repeated here.

In some cases, the textured surface region 556 may be characterized by one or more of the following roughness parameters. The root mean square height may be from 0.75 microns to 5 microns or from 1 micron to 5 microns. The mean pitch may be from 10 microns to 40 microns, from 15 microns to 40 microns, or from greater than 20 microns to less than or equal to 40 microns. The root mean square slope may be from 0.1 to 0.75, from 0.2 to 0.65, or from 0.3 to 0.75. The peak sharpness may be from 0.75 microns$^{-1}$ to 1.5 microns$^{-1}$. The textured surface region 558 may have a root mean square height less than 0.5 microns, less than 250 nm, or from 1 nm to about 250 nm.

A textured surface region of the cover member, such as the textured surface region 556, may be configured to provide a specified gloss level to the portion of the cover member defining the textured surface region. For simplicity, the gloss level measured by illuminating a textured surface region may be reference herein to the textured surface. However, when the portion of the cover member is translucent or transparent, some of the light illuminating the textured surface region will be transmitted through the cover member and may be reflected from an opposing surface of the cover member. The gloss value may depend in part on the index of refraction of the glass or glass ceramic portion of the cover. In some cases, the index of refraction may range from about 1.47 to about 1.57. In some cases, the endpoints of this range may vary by +/−10% or +1-5%. In some embodiments, measuring the gloss level by illuminating the textured region 556 may result in a gloss value of less than about 50 gloss units, less than about 40 gloss units, less than about 30 gloss units, less than about 20 gloss units, less than about 10 gloss units, from 1 gloss unit to less than 10 gloss units, from 2 gloss units to 7 gloss units, from 2 gloss units to 20 gloss units, from 10 gloss units from 20 gloss units, from 5 gloss units to 50 gloss units, from 10 gloss units to 50 gloss units, from 10 gloss units to 45 gloss units, or from 15 gloss units to 45 gloss units as measured at 60 degrees. The gloss level may be measured in the absence of a coating.

The gloss level of another surface region of the cover member, such as the textured region 558, may be different from that of the textured region 556. For example, the other surface region may have a higher gloss than the textured region 556, such as when the other region has a smoother surface. For example, measuring the gloss level by illuminating the other surface region may result in a gloss value of greater than about 70 gloss units, greater than about 80 gloss units, greater than about 90 gloss units, greater than about 100 gloss units, from 80 gloss units to less than 160 gloss units, from 90 gloss units to 150 gloss units, or from 100 gloss units to 140 gloss units, as measured at 60 degrees.

The difference between the gloss level of the surface regions may be at least 10% and less than 100% or at least 10% and less than 50%. In some cases, the difference in the gloss value may be at least 10 gloss units, at least 20 gloss units, at least 50 gloss units, from 70 gloss units to 160 gloss units, from 80 gloss units to 140 gloss units, or from 90 gloss units to 150 gloss units as measured at 60 degrees. In some cases, the gloss of the textured region may be measured using commercially available equipment and according to ASTM or ISO standard test methods. The angle measurement may refer to the angle between the incident light and the perpendicular to the textured region of the surface.

A textured surface region of a cover member, such as the textured region 556, may be configured to produce a translucent or hazy effect. A translucence level of the portion of the cover member defining the textured surface region can be assessed in several ways. For example, a translucence value can be measured by measuring the percentage of light incident on the textured surface region which is transmitted through the cover member. More specifically, the transmissive haze and/or the clarity can be measured to determine relative amounts of wide angle and narrow angle scattering. In addition, a relative translucence value can be determined as described below. A relative translucence value can be useful when a relatively small surface region is to be measured, such as a surface region in the range of 3 mm to 7 mm in diameter.

Relative translucence values include contrast ratio and translucency parameters. The contrast value is determined by measuring the reflected light using a white background and the reflected light using a black background. For example, the contrast ratio may be calculated as the luminance flux of a material on a black background divided by the luminance flux of a material on a white background. This contrast value is 1 for opaque materials and 0 for transparent materials and is more sensitive for materials having about 50% or greater light transmission. The translucency parameter is determined by measuring coordinates in CIEL*a*b* (CIELAB) color space when the material is on a black background and on a white background. For example, the translucency parameter may be calculated as the square root of $((L_{white}-L_{black})^2+(a_{white}-a_{black})^2+(b_{white}-b_{black})^2)$. In some cases, a higher translucency value indicates that a lesser amount of light is being transmitted through the material.

A textured surface region of the cover member may be configured to provide a specified level of cleanability. For example, the texture of the surface region may be configured so that a root mean square (RMS) height of the features is not overly large. The texture may also be configured so that a size of any recessed surface features and a spacing between surface features is sufficiently large to facilitate cleaning. In addition, the texture may be configured so that the root mean square (RMS) slope and/or the mean peak curvature of the surface features is small enough to provide the desired tactile properties in addition to the desired level of cleanability.

The strength or load bearing capacity of the cover member 534 may be tested by applying a load to the protruding feature. For example, a load may be applied to the rear surface of the protruding feature to introduce a tensile stress at the front (top) surface of the protruding feature. In some cases, the median load bearing capacity of the top of the protruding feature is from 400 N to 600 N or from 450 N to 550 N. In additional cases, 90% or more of the load bearing capacity values range between 300 N and 700 N. In some cases the strength is measured prior to chemical strengthening while in other cases the strength may be measured following chemical strengthening.

The cover member 534 may be a glass member, a glass ceramic member, or a member comprising one or more glass portions and one or more glass ceramic portions. A glass member or glass portion of a member typically includes a silica-based glass material. The glass material may have a network structure, such as a silicate-based network structure. In some embodiments, the glass material includes an aluminosilicate glass. As used herein, an aluminosilicate glass includes the elements aluminum, silicon, and oxygen, but may further include other elements. Typically, the glass material includes an ion-exchangeable glass material, such as an alkali metal aluminosilicate glass (e.g., a lithium aluminosilicate glass). An ion-exchangeable aluminosilicate glass may include monovalent or divalent ions that compensate for charges due to replacement of silicon ions by aluminum ions. Suitable monovalent ions include, but are not limited to, alkali metal ions such as $Li^+$, $Na^+$, or $K^+$. Suitable divalent ions include alkaline earth ions such as $Ca^{2+}$ or $Mg^{2+}$. As previously discussed with respect to FIG. 1B, the cover member 534 may be chemically strengthened through ion exchange. For example, the ions within the glass or glass ceramic may be exchanged for larger ions to create a compressive stress region along one or more surfaces of the cover member. The description of chemical strengthening provided with respect to FIGS. 8 and 9 is generally applicable herein and, for brevity, is not repeated here.

A glass ceramic member or a glass ceramic portion of a member includes a glass ceramic material. As referred to herein, a glass ceramic material comprises one or more crystalline phases formed by crystallization of a (precursor) glass material. Therefore, the glass ceramic material is at least partially crystallized. For example, a glass ceramic material may include from 50% to 90%, from 60% to 90%, from 70% to 90%, from 75% to 95%, or greater than 80% of a crystalline phase by volume. The glass ceramic material may further comprise an amorphous (glass) phase. The glass ceramic material may be an alkaline silicate, an alkaline earth silicate, an aluminosilicate, a boroaluminosilicate, a perovskite-type glass ceramic, a silicophosphate, an iron silicate, a fluorosilicate, a phosphate, or a glass ceramic material from another glass ceramic composition system. In some embodiments, the glass ceramic portion comprises an aluminosilicate glass ceramic or a boroaluminosilicate glass ceramic. In some embodiments, the glass ceramic material is formed by crystallization of an aluminosilicate glass material. For example, a lithium aluminosilicate glass ceramic member can be formed by crystallization of a lithium aluminosilicate (LAS) glass material.

FIG. 6 shows a detail view of a surface region 656 of a cover member 634. The surface region 656 may be an example of the surface region 556 of FIG. 5 in detail area 1-1 or similarly textured surface regions as described herein. The cover member 634 may be an example of the cover member 534 or of any of a variety of cover members described herein. Details of these cover members are applicable to the cover member 634 and, for brevity, will not be repeated here. The surface region 656 may also be similar to the surface region of the cover member 334 which corresponds to the surface region 346 of the cover assembly 324 and the surface region of the cover member 424 which corresponds to the surface region 448 of the cover assembly 424.

The surface region 656 comprises a plurality of surface features 680. As shown schematically in FIG. 6, the surface features 680 may define one or more recesses, such as the surface feature 684. The surface features 680 may also define one or more protrusions, such as the surface feature 682. In some embodiments, an average magnitude of the radius of curvature of the recesses is greater than an average magnitude of the radius of curvature of the protrusions. The shapes of the protrusions and recesses schematically shown in FIG. 6 are exemplary and not intended to be limiting.

In some embodiments, the surface features 680 define a set of hills and valleys. The hills and valleys may be defined using areal texture analysis techniques as described below. The surface feature 682 may generally correspond to a hill feature and the surface feature 684 may generally correspond to a valley feature. As shown in FIG. 6, the set of hills and valleys may have a non-uniform or an irregular spacing between hill features and/or valley features. In additional embodiments, a set of hills and valleys has a substantially uniform spacing between hill features, valley features, or a combination thereof.

The heights of the surface features 680 may be measured with respect to a reference surface 681. For example, the heights of the hills may be determined from the maximum points (e.g., point 683) and the heights of the valleys may be determined from the minimum points (e.g., point 685).

The example of the surface features provided in FIG. 6 is not limiting and in general the surface features 680 of a surface region of the cover member 634 may define any of a range of shapes or configurations. The surface features 680 may have a variety of shapes, such as rounded or angular features. As examples, the surface features 680 may define a circular, oval, polygonal, rectangular, or irregular surface contour. Furthermore, the surface features 680 may define protrusions, recesses, or a combination thereof and may have any suitable shape and may be pyramidal, conical, or cylindrical.

The surface features 680 may be configured to provide particular optical properties to the surface region 656, as well as to a cover assembly and an electronic device including the cover member 634. However, the surface features 680 defining the texture of the surface region may not be individually visually perceptible. In some cases, the texture of the surface region may cause the cover member 634 to appear translucent, rather than transparent. In some cases, the texture may be configured to provide particular levels of such optical properties as gloss, translucence, color, and combinations thereof. The following discussion of optical properties and texture parameters is generally applicable to the textured surface regions described herein, including the surface regions 556, 558, 656, and 758.

A textured surface region of the cover member may be configured to provide a specified level of transmissive haze to the corresponding portion of the cover member. In some cases, the transmissive haze of the surface region may be measured using commercially available equipment and according to ASTM or ISO standard test methods. The transmissive haze may relate to the amount of light subject to wide angle scattering (e.g., greater than 2.5 degrees). As non-limiting examples, the transmissive haze may be measured using a haze-gard i device available from BYK or a GC 5000L variable photometer available from Nippon Denshoku. The transmissive haze scattering may be measured for the cover assembly or cover member as removed from the electronic device. In some cases, the transmissive haze may be greater than or equal to about 50%, greater than or equal to about 60%, or greater than or equal to about 70%. For example, the transmissive haze may be from about 60% to about 90% or from about 70% to about 80%. In other cases, the transmissive haze of the surface region may have a lower amount of transmissive haze such as less than 50%, less than 40%, less than 30%, or less than 25%.

A textured surface region of the cover member may be configured to provide a specified level of clarity to the corresponding portion of the cover member. The clarity or the transmissive narrow angle scattering of the textured region may be measured using commercially available equipment and according to ASTM or ISO standard test methods. The transmissive narrow angle scattering may be measured using a haze-gard i device available from BYK or a GC 5000L variable photometer available from Nippon Denshoku. A clarity value may be determined from measurements of the intensity in a central region ($I_{central}$) and an intensity in a ring around the central region ($I_{ring}$). For example, the clarity value may be equal to $100\%*(I_{central}-I_{ring})/(I_{central}+I_{ring})$. The clarity or the transmissive narrow angle scattering may be measured for the cover assembly or cover member as removed from the electronic device. In some cases, the clarity may be less than about 50%, less than about 40%, less than about 30%, less than about 20%, less than about 15%, or less than about 10%. For example, the clarity may be from about 5% to about 30%, from about 5% to about 20%, from about 5% to about 15%, or from about 5% to about 15%.

In some cases, a textured surface region of the cover member may be configured to provide a specified level of visual uniformity to the corresponding portion of the cover member. The graininess of a textured region may be measured under diffused illumination using commercially available equipment. The graininess may be measured similarly for a textured region of a cover assembly. In some cases, an image of the textured surface region of the cover member may be obtained using a digital camera and the lightness of each pixel of the image may be determined, thereby allowing determination of the lightness variation across the textured surface. For example, the BYK-mac device available from BYK may produce a graininess value determined from a histogram of the lightness levels. In some cases, the graininess of the textured surface region may be less than about 1.5 or less than about 1.0. In addition, the graininess may be from about 0.1 to about 1.5, from about 0.1 to about 1.0, from about 0.25 to about 1.5, from about 0.25 to about 1.0, from about 0.5 to about 1.5, or from about 0.5 to about 1.0. These graininess values may be measured prior to application of any coating to the cover member.

Surface texture parameters include areal surface texture parameters such as amplitude parameters, spatial parameters, and hybrid parameters. Surface filtering may be used to exclude surface noise and/or surface waviness before determining the surface texture parameters. In addition, a segmentation technique may be used to determine feature parameters such as the maximum diameter, the minimum diameter, the area, and the perimeter. These parameters may be calculated on the basis of the feature shape as projected onto the reference surface (e.g., a reference plane). Mean values may be determined for a given class of surface features (e.g., hills or valleys). Surface texture parameters and methods for determining these parameters (including filtering and segmentation) are described in more detail in International Organization for Standardization (ISO) standard 25178 (Geometric Product Specifications (GPS)—Surface texture: Areal). These surface texture parameters may be measured using commercially available equipment, such as a Keyence roughness measurement microscope (e.g., a laser scanning confocal microscope) or a Zygo surface measuring device (e.g., a laser interferometer).

For example, the surface features (e.g., 680) of one or more surface regions of the cover member 634 may be characterized, in part, by the heights of the surface features. The height may be measured with respect to a reference surface, such as the arithmetical mean of the surface (schematically shown by line 681 in FIG. 6). The heights of the surface features may not be uniform, so that the surface features have a distribution of heights. In some cases, the magnitude of the heights of the surface features of one surface region may fall in the range from zero to about 5 microns, from zero to about 2.5 microns, from zero to about 2 microns, from zero to about 1.5 microns, or from zero to about 1 micron. The surface features may be characterized by the root mean square height Sq or the arithmetic mean height Sa of the surface. The root mean square (RMS) height of the surface features may be from about 0.75 microns to about 5 microns, from about 1 micron to about 5 microns, from greater than zero and less than about 2.5 microns, greater than zero and less than about 2 microns, greater than zero and less than about 1.5 microns, greater than zero and less than about 1 micron, from about 0.1 microns to about 2.5 microns, from about 0.1 microns to about 2 microns, from about 0.1 microns to about 1.5 microns, from about 0.1 microns to about 1.25 microns, from about 0.1 microns to about 1.0 micron, from about 0.2 microns to about 2.5 microns, from about 0.2 microns to about 2 microns, from about 0.2 microns to about 1.5 microns, from about 0.2 microns to about 1.25 microns, from about 0.2 microns to about 1.0 micron, from about 0.25 microns to about 2.5 microns, from about 0.25 microns to about 2 microns, from about 0.25 microns to about 1.5 microns, from about 0.25 microns to about 1.25 microns, from about 0.25 microns to about 1.0 micron, from about 0.5 microns to about 2.5 microns, from about 0.5 microns to about 2 microns, from about 0.5 microns to about 1.5 microns, from about 0.5 microns to about 1.25 microns, or from about 0.5 microns to about 1.0 micron. In some cases, one textured region may be referred to as being rougher than another textured region when it has a greater RMS height.

The RMS height of another region of the exterior surface of the cover member, such as the base region, may be similar to or different from that of a textured region such as 556 or 656. For example, the RMS height of the raised region may be greater than that of the base region. For example, the RMS height of the raised region may be at least 10% and less than 150%, at least 10% and less than 100%, or at least 10% and less than 50% greater than that of the base region. In some cases, the RMS height of the base region may be less than 0.5 microns, less than 250 nm, or from 1 nm to about 250 nm. In additional cases, the RMS height of the base region may be similar to that of a highly polished surface, such as from about 1 nm to about 150 nm, from about 1 nm to about 125 nm, from about 1 nm to about 100 nm, from about 1 nm to about 75 nm, from about 1 nm to about 50 nm, from about 1 nm to about 25 nm, or from 1 nm to about 10 nm.

In addition, the surface features of one or more surface regions may be characterized by lateral parameters, such as the distance between peaks. The spacing between peaks may not be uniform, so that there is a distribution of spacings between peaks. The average (mean) distance or spacing between peaks may be referred to as the average pitch or mean pitch. The average pitch may be from about 1 micron to about 20 microns, from about 1 micron to about 15 microns, from about 1 micron to about 10 microns, from about 2.5 microns to about 20 microns, from about 2.5 microns to about 15 microns, from about 2.5 microns to about 10 microns, from about 5 microns to about 40 microns, from about 5 microns to about 20 microns, from about 5 microns to about 15 microns, from about 10 microns to about 40 microns, from about 15 microns to about 40 microns, greater than 20 microns to about 40 microns, or from about 5 microns to about 10 microns.

In some embodiments, the surface features of one or more surface regions may be configured so to have a particular ratio of the average height of the peaks to the average spacing of the peaks. For example, the ratio of the RMS height to the mean pitch may be from about 0.01 to about 0.6, from about 0.01 to about 0.3, from about 0.02 to about 0.6, from about 0.02 to about 0.3, from about 0.03 to about 0.6, from about 0.03 to about 0.3, from about 0.04 to about 0.6, or from about 0.04 to about 0.3.

The surface features of one or more surface regions may also be characterized by a lateral size. For example, the surface features may be characterized by a maximum lateral (or linear) size and a minimum lateral (or linear size). The surface features may have a maximum lateral size small enough that they are not visually perceptible as individual features. In addition, the lateral size and spacing of the surface features may be configured so that the cover member has a sufficiently low level of graininess.

The surface features of one or more surface regions may be characterized by the root mean square slope (Sdq), also referred to as the root mean square gradient. In some embodiments, the root mean square slope may be greater than zero and less than about 1.25, greater than zero and less than about 1, from 0.1 to less than about 1.25, from about 0.1 to less than about 1, from about 0.1 to about 0.75, from about 0.1 to about 0.5, from about 0.2 to about 0.65, from about 0.25 to less than about 1, from about 0.25 to about 0.75, or from about 0.1 to about 0.5, or from about 0.3 to about 0.75. In some cases, the root mean square slope of the raised region is greater than that of the base region. For example, the root mean square slope of the raised region may be at least 10% and less than 60% greater than that of the base region.

The surface features of one or more surface regions may also be characterized by the curvature of the peaks (also referred to as summits), such as by the arithmetic mean summit curvature $S_{sc}$, also referred to herein as the mean peak curvature. In some embodiments, the arithmetic mean summit curvature is greater than zero and less than about 2.0 microns$^{-1}$, greater than zero and less than or equal to about 1.5 microns$^{-1}$, from about 0.1 microns$^{-1}$ to about 2.0 microns$^{-1}$, from about 0.1 microns$^{-1}$ to about 1.5 microns$^{-1}$, from about 0.25 microns$^{-1}$ to about 2.0 microns$^{-1}$, from about 0.25 microns$^{-1}$ to about 1.5 microns$^{-1}$, from about 0.5 microns$^{-1}$ to about 2.0 microns$^{-1}$, from about 0.5 microns$^{-1}$ to about 1.5 microns$^{-1}$ from about 0.75 microns$^{-1}$ to about 2.0 microns$^{-1}$, from about 0.75 microns$^{-1}$ to about 1.5 microns$^{-1}$, or from about 0.9 microns$^{-1}$ to about 1.35 microns$^{-1}$. In some cases, the mean peak curvature of the raised region is greater than that of the base region. For example, the mean peak curvature of the raised region may be at least 10% and less than 50% greater than that of the base region.

The surface features of one or more surface regions may also be characterized by an autocorrelation length. In some embodiments, the autocorrelation length is from about 1 micron to about 50 microns, from about 2 microns to about 30 microns, or from about 3 microns to about 25 microns.

As previously described with respect to FIG. 3, a coating may be disposed along an interior surface of the cover member. In some cases, the surface features of the cover member may be configured to minimize less desirable visual effects when the coating is viewed through a textured region, such as the textured region 656 or 758. For example, it may be preferred that the texture does not produce an undesirable amount of visual contrast variation and/or a visual texture.

FIG. 7 shows a detail view of a surface region 758 of a cover member 734. The surface region may be an example of the surface region 558 of FIG. 5 in detail area 2-2 or similarly textured surface regions as described herein. The cover member 734 may be an example of the cover member 534 or of any of a variety of cover members described herein. Details of these cover members are applicable to the cover member 734 and, for brevity, will not be repeated here. The surface region 758 may also be similar to the surface region of the cover member 334 which corresponds to the surface region 348 of the cover assembly 324 and the surface region of the cover member 434 which corresponds to the surface region 446 of the cover assembly 424.

The surface region 758 comprises a plurality of surface features 780. As shown in FIG. 7, the surface features 780 may define one or more recesses, such as the surface feature 784. The surface features 780 may also define one or more protrusions, such as the surface feature 782. The heights of the surface features 780 with respect to the reference surface 781 are generally smaller than those of the surface features 680 with respect to the reference surface 681, although the scale of FIG. 7 may be somewhat exaggerated in order to better illustrate details of the textured surface region. In some cases, the surface region 758 may be obtained by polishing a textured surface region similar to the surface region 656 of FIG. 6.

In some cases, the root mean square height of the surface region 758 may be less than 0.5 microns, less than 250 nm, from 1 nm to about 250 nm, from about 1 nm to about 125 nm, from about 1 nm to about 100 nm, from about 1 nm to about 75 nm, from about 1 nm to about 50 nm, from about 1 nm to about 25 nm, or from about 1 nm to about 10 nm.

FIG. 8 shows a flow chart of an example process 800 for forming a textured cover component, such as a glass cover member, a glass ceramic cover member, or a cover member comprising one or more glass portions and one or more glass ceramic portions. The description of suitable glass materials and glass ceramic materials provided with respect to FIG. 6 is generally applicable to the components and cover members described herein and, for brevity, is not repeated here.

The process 800 includes an operation 802 of mechanically texturing the component, an operation 804 of chemically etching the component, an operation 806 of selectively polishing the component, and an operation 808 of chemically strengthening the component. In some cases, the component includes a thicker portion and a thinner portion. The thicker portion may define a protruding feature and a raised surface region and the thinner portion may define a base surface region as shown, for example, in FIG. 5.

As shown in FIG. 8, the process 800 includes an operation 802 of mechanically texturing the component to form a textured surface region. Typically the operation 802 involves removing material from the external surface of the component using particles of an abrasive material, such cubic boron nitride, diamond, or silicon carbide. When the operation 802 involves multiple mechanical treatment steps, the earlier steps typically use a coarser abrasive than the later steps. The operation 802 may include a grinding operation, such as a CNC grinding step using a fixed abrasive material (e.g., metal or resin bonded to the grinding tool). The textured surface region is formed along the external surface of the component. The textured surface region may be formed on a raised surface region defined by a protruding feature of the component, on a base surface region, or both. In additional examples the raised surface region and the base surface region may be differently textured during the operation 802. For example, the raised surface region may be given a rougher or a smoother texture than the base surface region. By the way of example, a textured surface region of the component may have a root mean square height of from about 0.5 microns to about 2 microns, a pitch from about 2.5 microns to about 20 microns, and a root mean square slope from about 0.5 to about 1.75 following operation 802. Optionally, the component may be washed following the operation 802.

The process 800 further includes an operation 804 of chemically etching the textured surface region of the component produced by the operation 802. The operation 804 may also be referred to herein as an etching operation. Chemical etching techniques for glass and glass ceramic components may involve using a suitable acid or base (e.g., a hydrofluoric acid-based etchant) to remove portions of the component. The chemical etching may occur in the liquid phase or in a gas phase. Etching techniques also include reactive ion etching, which may use a mixture of a fluorine containing compound such as $CH_4$, $CHF_3$, $SF_6$ and the like in a gas such as argon or xenon. The etch treatment may etch the component to a sufficient depth to remove at least some of the small fissures or other such features formed during the operation 802 of mechanically texturing the component. In addition, the etch treatment may remove or reduce small fissures or other such features resulting from prior machining operations, such as machining operations to form the protruding feature and through-holes in the component. In some cases, the etching time is longer for a glass ceramic component than for a glass component of similar overall composition. In some cases, the pitch may generally increase and the root mean square slope may generally decrease after the operation 804. In additional cases, the root mean square height may also increase after the operation 804. By the way of example, the textured surface region of the component may have a root mean square height of from about 0.75 microns to 5 microns, a pitch from about 10 microns to 40 microns, and a root mean square slope from 0.1 to 0.75 following operation 804. Optionally, the component may be washed following the etch treatment 804.

The process 800 further includes an operation 806 of selectively polishing the textured region produced by the operation 804. For example, the operation 808 may be a mechanical polishing operation. The polishing operation may use a loose abrasive material, which may be supplied in a slurry to a polishing pad. In some cases, a polishing operation may have a polishing depth (the depth of the glass material removed) which is less than the full height of the surface features resulting from the operation 804. In some cases, the operation 806 may polish an external surface of the base portion and a side portion of the protruding feature, but not the top surface of the protruding feature. Alternately, the operation 806 may polish the top surface of the protruding feature, but not the base region of the component. For example, a surface of the component, such as the top surface of the protruding feature, may be masked to prevent polishing of the texture on this surface. The polished surface region may have a root mean square height less than 0.5 microns or less than 0.25 microns. Optionally, the component may be washed following the operation 808.

The process 800 further includes an operation 808 of chemically strengthening the component. In some cases, the operation 808 may take place after the operation 806 has been completed. The operation 808 may include an ion exchange operation which chemically strengthens the component. During the ion exchange operation, ions present in the glass or glass ceramic material can be exchanged for larger ions in a region extending from a surface of the component. The ion exchange may form a compressive stress layer (or region) extending from a surface of the component, as schematically illustrated in FIG. 9. In some cases, the operation 808 includes multiple ion exchange operations, which may occur sequentially or simultaneously. In some embodiments, a compressive stress layer is formed at each of the textured exterior surface and the interior surface of the component. A tensile stress layer may be formed between these compressive stress layers.

For example, an ion-exchangeable material of the component may include monovalent or divalent ions such as alkali metal ions (e.g., $Li^+$, $Na^+$, or $K^+$) or alkaline earth ions (e.g., $Ca^{2+}$ or $Mg^{2+}$) which may be exchanged for other alkali metal or alkaline earth ions. If the component comprises sodium ions, the sodium ions may be exchanged for potassium ions. Similarly, if the component comprises lithium ions, the lithium ions may be exchanged for sodium ions and/or potassium ions. In some embodiments, the compressive stress layer extends to a depth (or thickness) in the component which is greater than a lowest depth of the surface texture.

In an example, the chemical strengthening process involves exposing the component to a medium containing the larger ion, such as by immersing the component in a bath containing the larger ion or by spraying or coating the cover member with a source of the ions. For example, a salt bath comprising the ion of interest (e.g., a potassium nitrate bath) may be used for ion exchange. Suitable temperatures for ion exchange are above room temperature and are selected depending on process requirements. The ion exchange process may be conducted at a temperature below the strain point of the glass. The component may be cooled following the ion exchange operation. Depending on the factors already discussed above, a compression layer as deep as about 10-250 microns can be formed in a glass component. The surface compressive stress (CS) may be from about 300 MPa to about 1100 MPa. A mask can be used to shield portions of the component from ion exchange as desired. Optionally, the component is washed after the ion exchange operation 808. In some cases, the component is selectively polished again after the ion exchange operation 808.

In some embodiments, the process 800 may include additional operations. For example, the process 800 may include an operation of machining a workpiece or blank to a desired shape prior to operation 802. The operation of machining the workpiece or blank may include removing material around the portion of the workpiece that is to become the protruding feature. The operation of machining the workpiece or blank may further include drilling one or more holes in the component, such as a through-hole extending through a portion of the component. The operation of machining a workpiece or blank may involve one or more of a computer numerical control (CNC) machining process such as a CNC milling process, a CNC grinding process, and/or a CNC drilling process. The process 800 may alternately or additionally include one or more of a washing operation, a polishing operation, and/or a coating operation.

FIG. 9 schematically shows a cover member 934 after a chemical strengthening operation. The cover member 934 includes a protruding portion 937, a surface region 956 defining a top of the protruding portion, a base portion 938, and a surface region 958. Through-holes 967 and 968 extend through the cover member 934 and its protruding portion 937.

As shown in FIG. 9, a compressive stress layer 994 extends from the exterior surface 954 and a compressive stress layer 992 extends from the interior surface 952 of the cover member 934 (not shown to scale). The compressive stress layer 994 may therefore be referred to as an exterior compressive stress layer and the compressive stress layer 992 may therefore be referred to as an interior compressive stress layer. A tensile stress layer 993 is positioned between the compressive stress layers 992 and 994. In the example of FIG. 9, the compressive stress layer 994 has substantially the same depth as the compressive stress layer 992. However, this example is not limiting and in some cases the depth of the compressive stress layer 994 may be different from that of the compressive stress layer 992. For example, the depth of the compressive stress layer 994 may be substantially greater than that of the compressive stress layer 992.

As shown in FIG. 9, the cover member 934 also includes a compressive stress layer 996 extending from a wall surface defining a through-hole, such as the wall surface 955 defining the through-hole 967. For example, the compressive stress layer 996 may be created when the through-hole 967 is formed prior to a chemical strengthening operation. The compressive stress layer 996 may have a depth substantially the same as that of the compressive stress layer 992 or 994, or may have some other depth. The cover member 934 may be an embodiment of the cover member 534 of FIG. 5 or any other cover member described herein.

As examples, the depth of the compressive stress layer 994 for a glass cover member may be from 75 microns to 250 microns, from 100 microns to 250 microns, or from 125 microns to 250 microns. In some cases, a compressive stress layer (e.g., 992, 796, or 798) may have a depth greater than the depth of any subsurface features remaining from the texturing process. The depth of the compressive stress layer 992 may be the same as that of the compressive stress layer 994 or may be from about 5 microns to about 100 microns or from about 5 microns to about 50 microns.

FIG. 10 shows a block diagram of a sample electronic device that can incorporate a textured component as described herein, such as a textured cover member. The schematic representation depicted in FIG. 10 may correspond to components of the devices depicted in FIGS. 1A to 9 as described above. However, FIG. 10 may also more generally represent other types of electronic devices with cover assemblies as described herein.

In embodiments, an electronic device 1000 may include sensors 1020 to provide information regarding configuration and/or orientation of the electronic device in order to control the output of the display. For example, a portion of the display 1008 may be turned off, disabled, or put in a low energy state when all or part of the viewable area of the display 1008 is blocked or substantially obscured. As another example, the display 1008 may be adapted to rotate the display of graphical output based on changes in orientation of the device 1000 (e.g., 90 degrees or 180 degrees) in response to the device 1000 being rotated.

The electronic device 1000 also includes a processor 1006 operably connected with a computer-readable memory 1002. The processor 1006 may be operatively connected to the memory 1002 component via an electronic bus or bridge. The processor 1006 may be implemented as one or more computer processors or microcontrollers configured to perform operations in response to computer-readable instructions. The processor 1006 may include a central processing unit (CPU) of the device 1000. Additionally, and/or alternatively, the processor 1006 may include other electronic circuitry within the device 1000 including application specific integrated chips (ASIC) and other microcontroller devices. The processor 1006 may be configured to perform functionality described in the examples above.

The memory 1002 may include a variety of types of non-transitory computer-readable storage media, including, for example, read access memory (RAM), read-only memory (ROM), erasable programmable memory (e.g., EPROM and EEPROM), or flash memory. The memory 1002 is configured to store computer-readable instructions, sensor values, and other persistent software elements.

The electronic device 1000 may include control circuitry 1010. The control circuitry 1010 may be implemented in a single control unit and not necessarily as distinct electrical circuit elements. As used herein, "control unit" will be used synonymously with "control circuitry." The control circuitry 1010 may receive signals from the processor 1006 or from other elements of the electronic device 1000.

As shown in FIG. 10, the electronic device 1000 includes a battery 1014 that is configured to provide electrical power to the components of the electronic device 1000. The battery 1014 may include one or more power storage cells that are linked together to provide an internal supply of electrical power. The battery 1014 may be operatively coupled to power management circuitry that is configured to provide appropriate voltage and power levels for individual components or groups of components within the electronic device 1000. The battery 1014, via power management circuitry, may be configured to receive power from an external source, such as an alternating current power outlet. The battery 1014 may store received power so that the electronic device 1000 may operate without connection to an external power source for an extended period of time, which may range from several hours to several days.

In some embodiments, the electronic device 1000 includes one or more input devices 1018. The input device 1018 is a device that is configured to receive input from a user or the environment. The input device 1018 may include, for example, a push button, a touch-activated button, a capacitive touch sensor, a touch screen (e.g., a touch-sensitive display or a force-sensitive display), a capacitive touch button, a dial, a crown, or the like. In some embodiments, the input device 1018 may provide a dedicated or primary function, including, for example, a power button, volume buttons, home buttons, scroll wheels, and camera buttons.

The device 1000 may also include one or more sensors or sensor modules 1020, such as a force sensor, a capacitive sensor, an accelerometer, a barometer, a gyroscope, a proximity sensor, a light sensor, or the like. In some cases, the device 1000 includes a sensor array (also referred to as a sensing array) which includes multiple sensors 1020. For example, a sensor array associated with a protruding feature of a cover member may include an ambient light sensor, a Lidar sensor, and a microphone. As previously discussed with respect to FIG. 1B, one or more camera modules may also be associated with the protruding feature. The sensors 1020 may be operably coupled to processing circuitry. In some embodiments, the sensors 1020 may detect deformation and/or changes in configuration of the electronic device and be operably coupled to processing circuitry that controls the display based on the sensor signals. In some implementations, output from the sensors 1020 is used to reconfigure the display output to correspond to an orientation or folded/unfolded configuration or state of the device. Example sensors 1020 for this purpose include accelerometers, gyroscopes, magnetometers, and other similar types of position/orientation sensing devices. In addition, the sensors 1020 may include a microphone, an acoustic sensor, a light sensor (including ambient light, infrared (IR) light, and ultraviolet (UV) light), an optical facial recognition sensor, a depth measuring sensor (e.g., a time of flight sensor), a health monitoring sensor (e.g., an electrocardiogram (erg) sensor, a heart rate sensor, a photoplethysmogram (ppg) sensor, or a pulse oximeter), a biometric sensor (e.g., a fingerprint sensor), or other types of sensing device.

In some embodiments, the electronic device 1000 includes one or more output devices 1004 configured to provide output to a user. The output device 1004 may include a display 1008 that renders visual information generated by the processor 1006. The output device 1004 may also include one or more speakers to provide audio output. The output device 1004 may also include one or more haptic devices that are configured to produce a haptic or tactile output along an exterior surface of the device 1000.

The display 1008 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1008 is a liquid-crystal display or an electrophoretic ink display, the display 1008 may also include a backlight component that can be controlled to provide variable levels of display brightness. If the display 1008 is an organic light-emitting diode or an organic electroluminescent-type display, the brightness of the display 1008 may be controlled by modifying the electrical signals that are provided to display elements. In addition, information regarding configuration and/or orientation of the electronic device may be used to control the output of the display as described with respect to input devices 1018. In some cases, the display is integrated with a touch and/or force sensor in order to detect touches and/or forces applied along an exterior surface of the device 1000.

The electronic device 1000 may also include a communication port 1012 that is configured to transmit and/or receive signals or electrical communication from an external or separate device. The communication port 1012 may be configured to couple to an external device via a cable, adaptor, or other type of electrical connector. In some embodiments, the communication port 1012 may be used to couple the electronic device 1000 to a host computer.

The electronic device 1000 may also include at least one accessory 1016, such as a camera, a flash for the camera, or other such device. The camera may be part of a camera assembly that may be connected to other parts of the electronic device 1000 such as the control circuitry 1010.

As used herein, the terms "about," "approximately," "substantially," "similar," and the like are used to account for relatively small variations, such as a variation of +/−10%, +/−5%, +/−2%, or +/−1%. In addition, use of the term "about" in reference to the endpoint of a range may signify a variation of +/−10%, +/−5%, +/−2%, or +/−1% of the endpoint value. In addition, disclosure of a range in which at least one endpoint is described as being "about" a specified value includes disclosure of the range in which the endpoint is equal to the specified value.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. In addition, as used herein the phrase "one or more of" preceding a series of items, with the term "and" or "or" separating the items, does not require selection of one of each item listed; rather, the phrase allows a meaning that includes at a minimum one of any of the items, and/or at a minimum one of any combination of the items, and/or at a minimum one of each of the items. Similarly, it may be appreciated that an order of elements presented for a conjunctive or disjunctive list provided herein should not be construed as limiting the disclosure to only that order provided.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A mobile phone comprising:
a display;
a set of camera modules; and
an enclosure comprising:
a housing;
a front cover assembly coupled to the housing and positioned over the display; and
a rear cover assembly coupled to the housing, comprising a glass cover member, and defining:
a base surface region;
a protruding feature comprising a raised surface region, the rear cover assembly producing optical contrast between the raised surface region and the base surface region; and
a set of through-holes, each through-hole of the set of through-holes extending through the protruding feature and defining an opening at the raised surface region, each camera module of the set of camera modules extending at least partially into a respective through-hole of the set of through-holes.

2. The mobile phone of claim 1, wherein:
the raised surface region has a texture defined at least in part by a surface texture of the glass cover member; and
the gloss value of the raised surface region is less than the gloss value of the base surface region of the rear cover assembly.

3. The mobile phone of claim 2, wherein the surface texture of the glass cover member produces a gloss value that is in a range from 5 gloss units to 50 gloss units as measured at 60 degrees.

4. The mobile phone of claim 2, wherein:
the texture of the raised surface region is a second texture and the base surface region has a first texture;

the surface texture of the glass cover member is a second surface texture and the glass cover member further defines a first surface texture, different from the second surface texture;

the first texture of the raised surface region is defined at least in part by the first surface texture of the glass cover member.

5. The mobile phone of claim 2, wherein the surface texture of the glass cover member has:

a root mean square height (Sq) that is greater than zero and less than or equal to 5 micrometers; and a root mean square gradient (Sdq) in a range from greater than zero to less than 1.

6. The mobile phone of claim 5, wherein the surface texture of the glass cover member has a mean peak curvature (Ssc) that is greater than zero and less than 2 micrometers−1.

7. The mobile phone of claim 1, wherein:

the glass cover member is a first glass cover member;

the base surface region has a texture defined at least in part by a surface texture of the first glass cover member;

the rear cover assembly further comprises a second glass cover member coupled to the first glass cover member and at least partially defining the protruding feature; and the gloss value of the raised surface region is greater than the gloss value of the base surface region of the rear cover assembly.

8. A mobile phone comprising:

a display;

an enclosure enclosing the display and comprising:

a housing;

a first cover assembly coupled to the housing, defining a front surface of the mobile phone, and positioned over the display; and a second cover assembly coupled to the housing and comprising a glass cover member at least partially defining a protruding feature of the second cover assembly, the second cover assembly defining:

a first surface region having a first gloss value;

a second surface region of the protruding feature, the second surface region protruding with respect to the first surface region, defining a texture, and having a second gloss value that is lower than the first gloss value; and a set of through-holes extending through the protruding feature; and a set of camera modules, each camera module of the set of camera modules extending into a respective through-hole of the set of through-holes.

9. The mobile phone of claim 8, wherein:

the texture of the second surface region is a second texture;

the first surface region defines a first texture;

a first surface texture of the glass cover member at least partially defines the first texture of the first surface region; and a second surface texture, different from the first surface texture, of the glass cover member at least partially defines the second texture of the second surface region.

10. The mobile phone of claim 9, wherein:

the second surface region defines a plateau; and the protruding feature further defines a third surface region that defines a side of the protruding feature.

11. The mobile phone of claim 9, wherein the second cover assembly further comprises a coating comprising at least one color layer, coupled to an interior surface of the glass cover member, and visible through the first surface region and the second surface region of the second cover assembly.

12. The mobile phone of claim 9, wherein the second cover assembly further comprises an oleophobic coating disposed over an exterior surface of the glass cover member;

the first surface texture of the glass cover member and the oleophobic coating together define the first texture of the first surface region; and the second surface texture of the glass cover member and the oleophobic coating together define the second texture of the second surface region.

13. The mobile phone of claim 9, wherein:

the first surface texture of the glass cover member has a root mean square height (Sq) in a range from 1 nm to 125 nm; and the second surface texture of the glass cover member has a root mean square height (Sq) in a range from 0.25 micrometers to 2.5 micrometers.

14. The mobile phone of claim 13, wherein the second surface texture of the glass cover member has:

a root mean square gradient (Sdq) in a range from 0.25 to less than 0.75; and a mean pitch between peaks ranging from 5 microns to 20 microns.

15. A mobile phone comprising:

a display;

a set of camera modules; and an enclosure comprising:

a housing;

a front cover assembly coupled to the housing and positioned over the display; and a rear cover assembly coupled to the housing and defining:

a first surface region having a first gloss value;

a protruding feature positioned over the camera assembly, at least partially surrounded by the first surface region, and comprising a second surface region having a second gloss value that is different from the first gloss value; and a set of openings, each camera module of the set of camera modules extending at least partially into a respective opening of the set of openings.

16. The mobile phone of claim 15, wherein:

the rear cover assembly comprises a glass cover member; and the protruding feature is defined at least in part by the glass cover member.

17. The mobile phone of claim 16, wherein:

the glass cover member defines a surface texture that at least partially defines a texture of the second surface region;

the surface texture of the glass cover member produces a gloss value that is in a range from 5 gloss units to 20 gloss units as measured at 60 degrees; and the first gloss value is greater than the second gloss value.

18. The mobile phone of claim 16, wherein the first surface region is defined at least in part by the glass cover member.

19. The mobile phone of claim 16, wherein:

the rear cover assembly further comprises a glass ceramic cover member; and the glass ceramic cover member at least partially defines the first surface region.

20. The mobile phone of claim 19, wherein the rear cover assembly further comprises a set of windows coupled to the protruding feature, each window of the set of windows positioned over a respective opening of the set of openings.

\* \* \* \* \*